(12) United States Patent
Sakai et al.

(10) Patent No.: US 6,659,901 B2
(45) Date of Patent: Dec. 9, 2003

(54) INFINITE SPEED RATIO CONTINUOUSLY VARIABLE TRANSMISSION

(75) Inventors: Hiromasa Sakai, Yokosuka (JP); Toshikazu Oshidari, Yokosuka (JP)

(73) Assignee: Nissan Motor Co., Ltd., Yokohama (JP)

(*) Notice: Subject to any disclaimer, the term of this patent is extended or adjusted under 35 U.S.C. 154(b) by 130 days.

(21) Appl. No.: 09/821,688

(22) Filed: Mar. 30, 2001

(65) Prior Publication Data

US 2001/0041640 A1 Nov. 15, 2001

(30) Foreign Application Priority Data

Mar. 30, 2000 (JP) ........................... 2000-094795

(51) Int. Cl.[7] ............................................. F16H 37/08
(52) U.S. Cl. ...................... 475/218; 475/215; 475/208; 477/39
(58) Field of Search ..................... 475/207, 208, 475/209, 211, 215, 218; 477/39

(56) References Cited

U.S. PATENT DOCUMENTS

| | | | |
|---|---|---|---|
| 3,406,597 A | | 10/1968 | Perry et al. |
| 4,402,237 A | | 9/1983 | Tomlinson |
| 4,644,820 A | * | 2/1987 | Macey et al. ............... 475/211 |
| 5,194,052 A | * | 3/1993 | Ueda et al. .................. 475/66 |
| 5,238,460 A | * | 8/1993 | Esaki et al. ................. 475/192 |
| 5,667,456 A | * | 9/1997 | Fellows ....................... 475/214 |
| 5,803,858 A | * | 9/1998 | Haka .......................... 475/207 |
| 5,876,299 A | * | 3/1999 | Kim et al. ................... 475/193 |
| 6,036,616 A | * | 3/2000 | McCarrick et al. ......... 475/206 |
| 6,251,038 B1 | * | 6/2001 | Ishikawa et al. ............ 475/216 |
| 6,287,232 B1 | * | 9/2001 | Sakai et al. ................. 475/216 |
| 6,351,700 B1 | * | 2/2002 | Muramoto et al. ........... 477/39 |
| 6,358,179 B1 | * | 3/2002 | Sakai et al. ................. 475/216 |
| 6,436,001 B1 | * | 8/2002 | Sakai et al. ................. 475/216 |

FOREIGN PATENT DOCUMENTS

| | | |
|---|---|---|
| EP | 0 245 079 A1 | 11/1987 |
| EP | 0 866 242 A2 | 9/1998 |
| GB | 2023 753 A | 1/1980 |
| JP | 7-139608 | 5/1995 |
| JP | 10-325459 | 12/1998 |

* cited by examiner

*Primary Examiner*—Jack Lavinder
*Assistant Examiner*—Bradley T King
(74) *Attorney, Agent, or Firm*—Foley & Lardner

(57) ABSTRACT

A three-way clutch unit (9) comprising a forward clutch (91), second clutch (92) and forward one way clutch (93) which sets a power recirculation mode, a high clutch (10) which sets a direct mode, and a mode change-over valve (175) which supplies an oil pressure to one of the high clutch (10) and second clutch (92), are provided.

10 Claims, 18 Drawing Sheets

1

INFINITE SPEED RATIO CONTINUOUSLY VARIABLE TRANSMISSION

FIELD OF THE INVENTION

This invention relates to improvement of an infinite speed ratio continuously variable transmission used in vehicles, etc.

BACKGROUND OF THE INVENTION

Examples of vehicle transmissions known in the art are belt type or toroidal type continuously variable transmissions. An infinite speed ratio continuously variable transmission (hereafter referred to as IVT) is also known wherein a fixed speed ratio transmission and planetary gear set are combined with a continuously variable transmission (hereafter referred to as CVT) to enlarge the speed change region of the CVT, and a speed ratio can be varied up to infinity, as disclosed for example in Tokkai Hei 10-325459 published by the Japanese Patent Office in 1998.

In such the IVT, torque transmission and speed ratio are controlled by a differential pressure acted on a piston of a hydraulic actuator which drives a trunnion. As shown in FIG. 17, by engaging a power recirculation mode clutch and releasing a direct mode clutch, a power recirculation mode can be selected wherein a unit speed ratio (hereafter referred to as IVT ratio ii, unit input shaft rotation speed/unit output shaft rotation speed) is varied continuously from a negative value to a positive value including infinity (=geared neutral point), according to the difference of speed ratio of the CVT and fixed speed ratio transmission. Alternatively, by releasing the power recirculation mode clutch and engaging the direct mode clutch, a direct mode can be selected wherein speed change control is performed according to the speed ratio of the CVT (hereafter referred to as CVT ratio ic).

If the change-over between the power recirculation mode and direct mode is performed at or in the vicinity of the rotation synchronous point RSP (FIG. 17) where the IVT ratio ii coincides in the power recirculation mode and direct mode, the change-over between the power recirculation mode clutch and direct mode clutch can be made while suppressing shock.

SUMMARY OF THE INVENTION

However, in the aforesaid prior art, except when a change-over of running mode was performed, the power recirculation mode clutch and direct mode clutch were engaged and released based on independently controlled clutch pressures, and if there was a fault in the control unit or a valve stick occurred, there was a possibility that both clutches would simultaneously engage.

For example, when the vehicle is traveling in the power recirculation mode, if the direct mode clutch is engaged due to a fault, the IVT ratio ii must take a value corresponding to the rotation synchronous point RSP, so the CVT ratio ic is forced to vary towards the rotation synchronous point RSP as shown by the dot-and-dash line of FIG. 17.

Conversely, when the vehicle is traveling in the direct mode, if the power recirculation mode clutch is engaged due to a fault, the IVT ratio ii must again take a value corresponding to the rotation synchronous point RSP as described above, so the CVT ratio ic is forced to vary towards the rotation synchronous point RSP. In both modes, when a fault occurs, a speed change ratio may vary.

It is therefore an object of this invention, which was conceived in view of the above problem, to prevent a speed change from varying towards the rotation synchronous point RSP due to a fault in a control device.

In order to achieve above object, this invention provides a toroidal continuously variable transmission comprising an infinite speed ratio continuously variable transmission, comprising a continuously variable transmission which can vary speed ratio continuously, a fixed speed ratio transmission, a unit input shaft which connects to input side of the continuously variable transmission and the fixed speed ratio transmission, a unit output shaft which connects to output side of the continuously variable transmission and the fixed speed ratio transmission via a planetary gear set, a first clutch device interposed between the fixed speed ratio transmission and the planetary gear set, which sets a power recirculation mode, a second clutch device interposed between the continuously variable transmission and the unit output shaft, which sets a direct mode, and a clutch control unit which controls the power recirculation mode and the direct mode by selectively engaging the clutches of the first and second clutch devices according to the running state, wherein at least one of the first clutch device and the second clutch device provides a one way clutch, a first clutch interposed in series to the one way clutch and a second clutch which is provided in parallel to the one way clutch, and the clutch control unit only permits engaging one of the first clutch device and the second clutch device when both the first clutch device and the second clutch device can transmit torque in both directions.

This invention further provides an infinite speed ratio continuously variable transmission, comprising a continuously variable transmission which can vary speed ratio continuously, a fixed speed ratio transmission, a unit input shaft which connects to input side of the continuously variable transmission and the fixed speed ratio transmission, a unit output shaft which connects to output side of the continuously variable transmission and the fixed speed ratio transmission via a planetary gear set, a first clutch device interposed between the fixed speed ratio transmission and the planetary gear set, which sets a power recirculation mode, a second clutch device interposed between the continuously variable transmission and the unit output shaft, which sets a direct mode, at least one of the first clutch device and the second clutch device can select a state from a engaging state which transmit torque in at least one direction, a engaging state which transmit torque in both direction, and a release state which does not transmit torque, and a clutch control unit which controls the power recirculation mode and the direct mode by selectively engaging the clutches of the first and second clutch devices according to the running state, wherein the clutch control unit only permits engaging one of the first clutch device and the second clutch device when both the first clutch device and the second clutch device can transmit torque in both directions.

DESCRIPTION OF THE PREFERRED EMBODIMENTS

Figure 1:
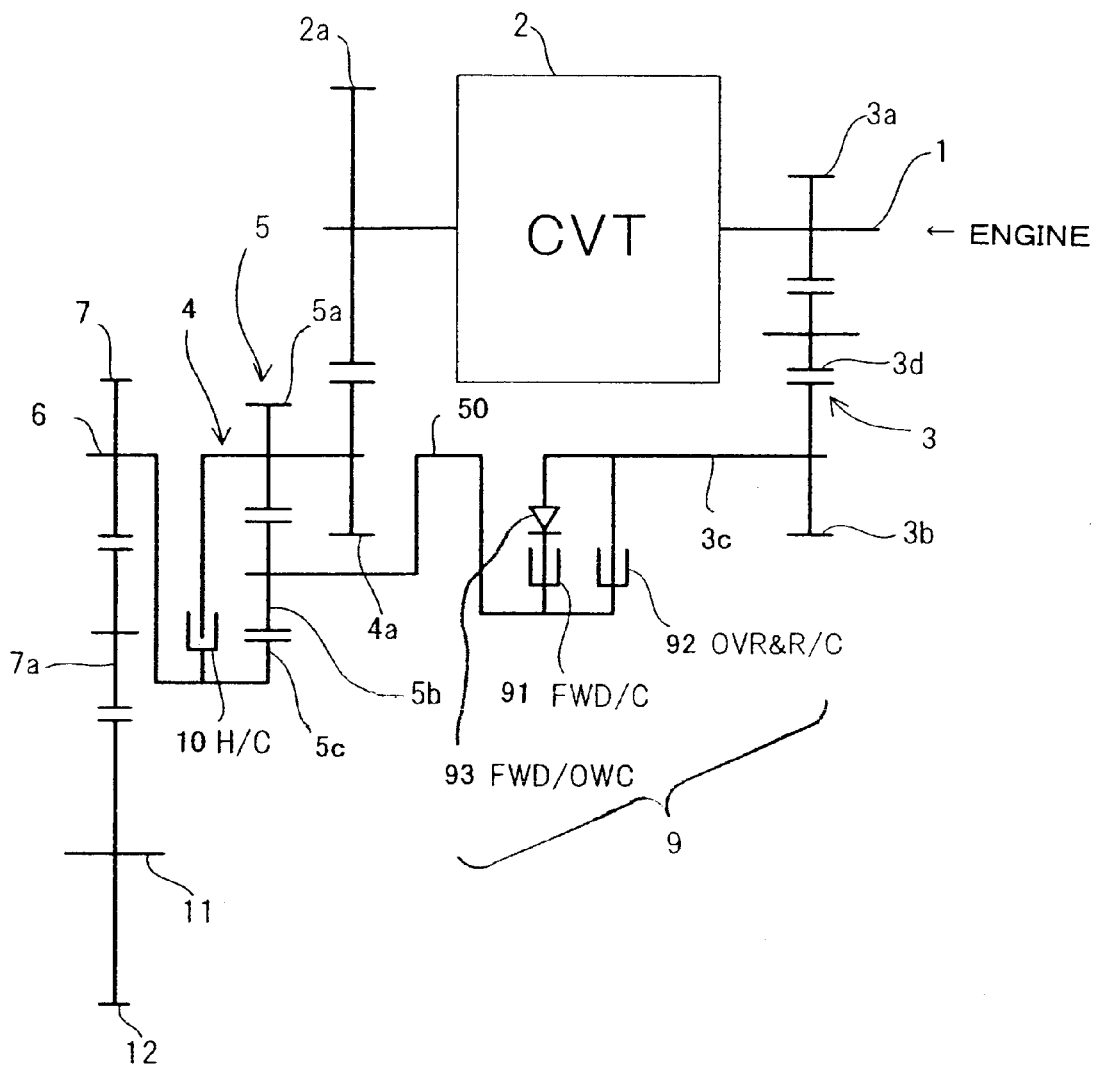
FIG. 1 is a schematic view of an IVT showing one embodiment of this invention.

FIG. 1 shows an example of an IVT using a half toroidal, double cavity type toroidal CVT 2.

First, referring to FIG. 1, a unit input shaft 1 connected to an engine (not shown) is provided with a gear 3a of a fixed speed ratio transmission 3, and is connected with the input side of the toroidal CVT 2. An output gear 2a is provided on the output side of the CVT 2.

A fixed speed ratio transmission output shaft 3c, carrier 50, CVT output shaft 4 and unit output shaft 6 are arranged sequentially and coaxially parallel to this unit input shaft 1.

A gear 3b which meshes with the gear 3a of the unit input shaft 1 is disposed via a counter gear 3d at one end of the fixed speed ratio transmission output shaft 3c. The fixed speed change transmission 3 comprises the gear 3a, counter gear 3d and gear 3b.

An overrun & reverse clutch (hereafter referred to as OVR&R/C, and as a second clutch in claims) 92 which can be selectively engaged with one end of the carrier 50 is interposed in the middle of the fixed speed ratio transmission output shaft 3c.

And a forward one-way clutch (hereafter referred to as FWD/OWC, and as a one way clutch in claims) 93 and forward clutch (hereafter referred to as FWD/C, and as a first clutch in claims) 91 which can be selectively engaged with the middle of the carrier 50 are interposed in series at the other end of the fixed speed ratio transmission output shaft 3c.

The FWD/OWC 93 transmits torque from the fixed speed ratio transmission output shaft 3c to the carrier 50, and interrupts torque in the opposite direction (from the carrier 50 to the fixed speed ratio transmission output shaft 3c).

The other ends of this carrier 50 are connected with a pinion 5b of a planetary gear set 5 disposed in the middle of the CVT output shaft 4.

Here, a gear 4a which meshes with the output gear 2a of the CVT 2 is disposed at one end of the CVT output shaft 4, and a sun gear 5a of the planetary gear set 5 is formed in the middle of the CVT output shaft 4.

In the planetary gear set 5, this sun gear 5a meshes with the pinion 5b which can be selectively joined with the fixed speed ratio transmission output shaft 3c via the carrier 50, and this pinion 5b also meshes with a ring gear 5c joined to one end of the unit output shaft 6.

A high clutch (hereafter referred to as H/C) 10 which engages in the direct mode is interposed between the other end of the CVT output shaft 4, and the middle of the unit output shaft 6.

The unit output shaft 6, which is the output shaft of the IVT, transmits the torque to a drive shaft 11 via a counter gear 7a and final gear 12 from a transmission output gear 7 provided at the other end.

In addition, the above-mentioned FWD/C 91, OVR&R/C 92 and FWD/OWC 93, constitute a three-way clutch unit 9 (first clutch device) which engages at least in the power recirculation mode.

<1. CVT>

Figure 2:
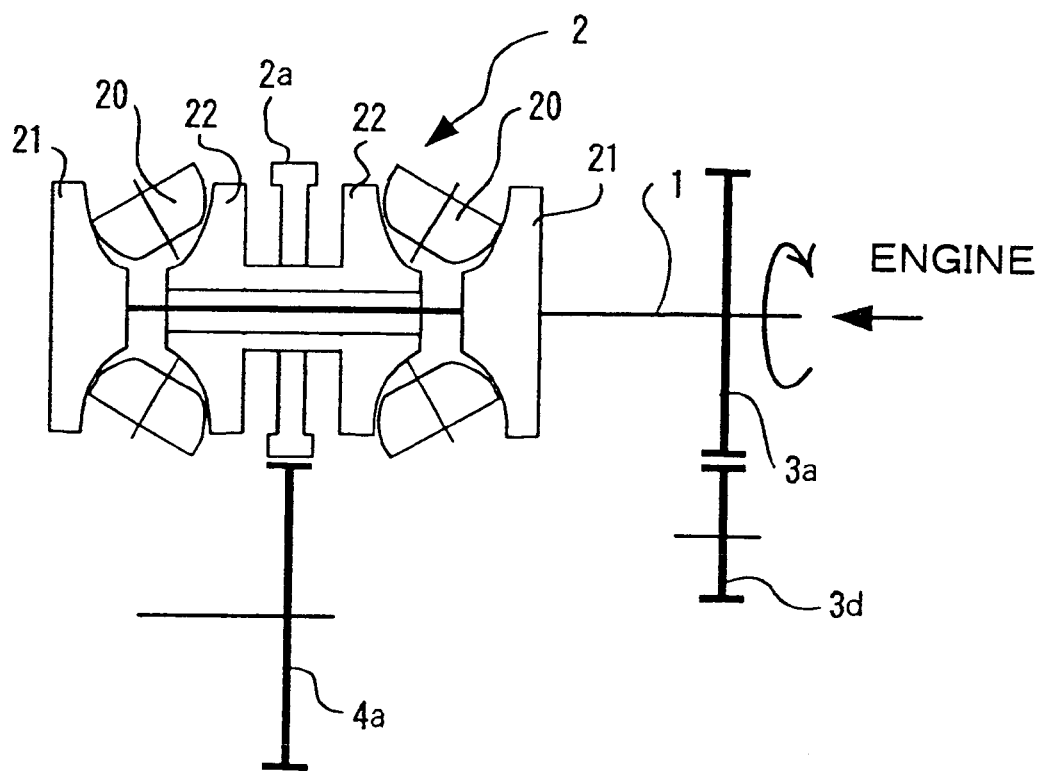
FIG. 2 is a schematic view of a toroidal type CVT.
Figure 3:
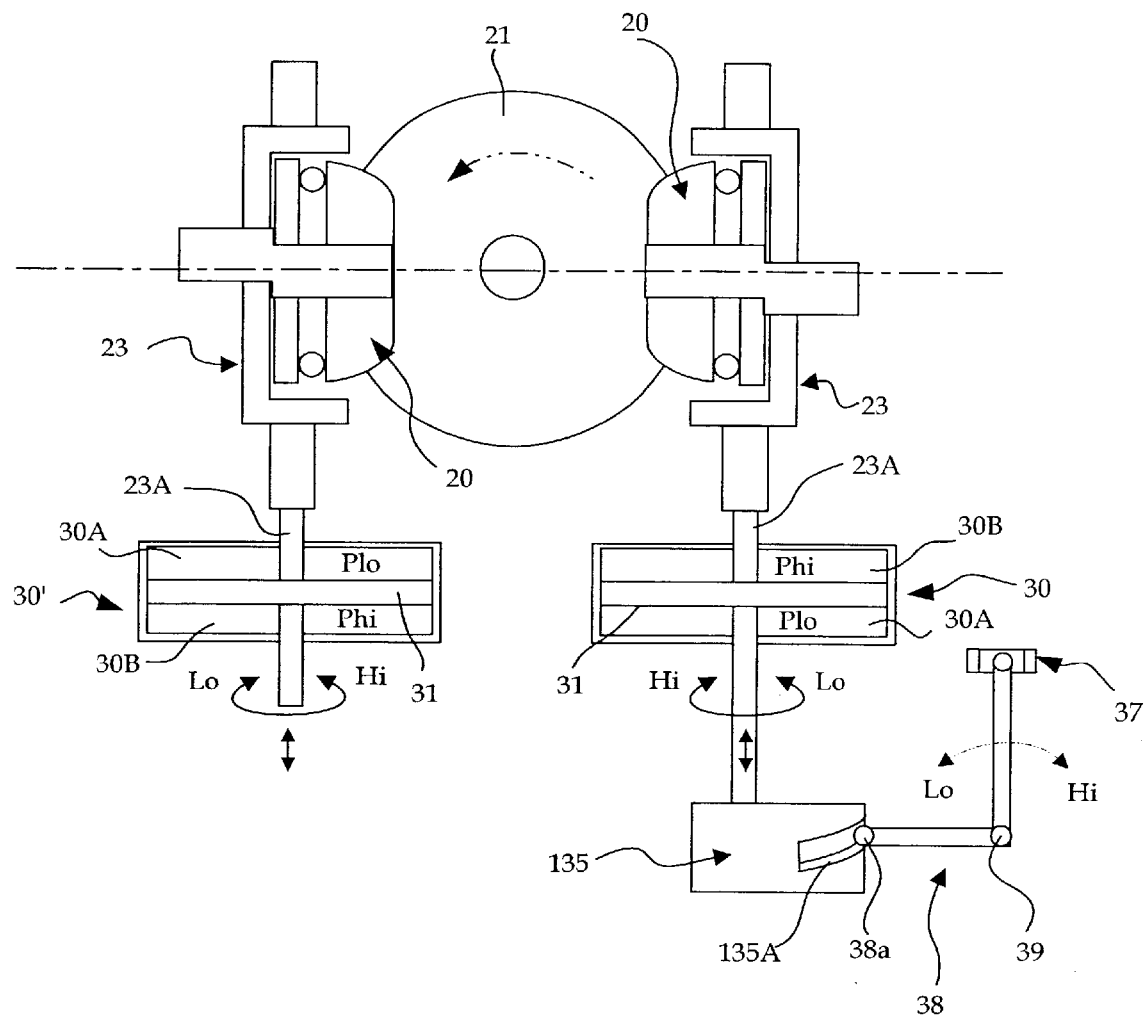
FIG. 3 is a conceptual diagram showing a speed change mechanism of the toroidal type CVT.

Here, the CVT 2 comprises two sets of input disks 21 and output disks 22 forming a double cavity toroidal shape which respectively grips and presses power rollers 20, as shown in FIG. 2 in FIG. 3.

The power roller 20 is supported by a trunnion 23 (power roller supporting member) whereof the lower end engages with an hydraulic cylinder 30, and which is free to displace in an axial direction and rotate around the axis, as shown in FIG. 3. A precess cam 135 which feeds back an axial displacement amount of the trunnion 23 and a gyration angle ϕ (=rotation angle of the trunnion 23 is almost equal to real speed ratio) of the power roller 20 to a shift control valve 246 shown in FIG. 4, is provided at the lower end of one of plural trunnions 23.

The precess cam 135 comprises a cam groove (cam surface) 135A having a predetermined inclination in the circumferential direction as shown in FIG. 3, and one end of a feedback link 38 which is free to slide, slides in this cam groove 135A.

The feedback link 38 is formed in, for example, an L-shape, and is supported free to pivot around a pivot shaft 39. One end of the link 38 slides in the cam groove or on the cam surface, while the other end engages with one end of a speed change link 37. The axial displacement and rotation amount of the trunnion 23, i.e., the gyration angle of the power roller 20, are thereby transmitted to one end of the speed change link 37.

Figure 4:
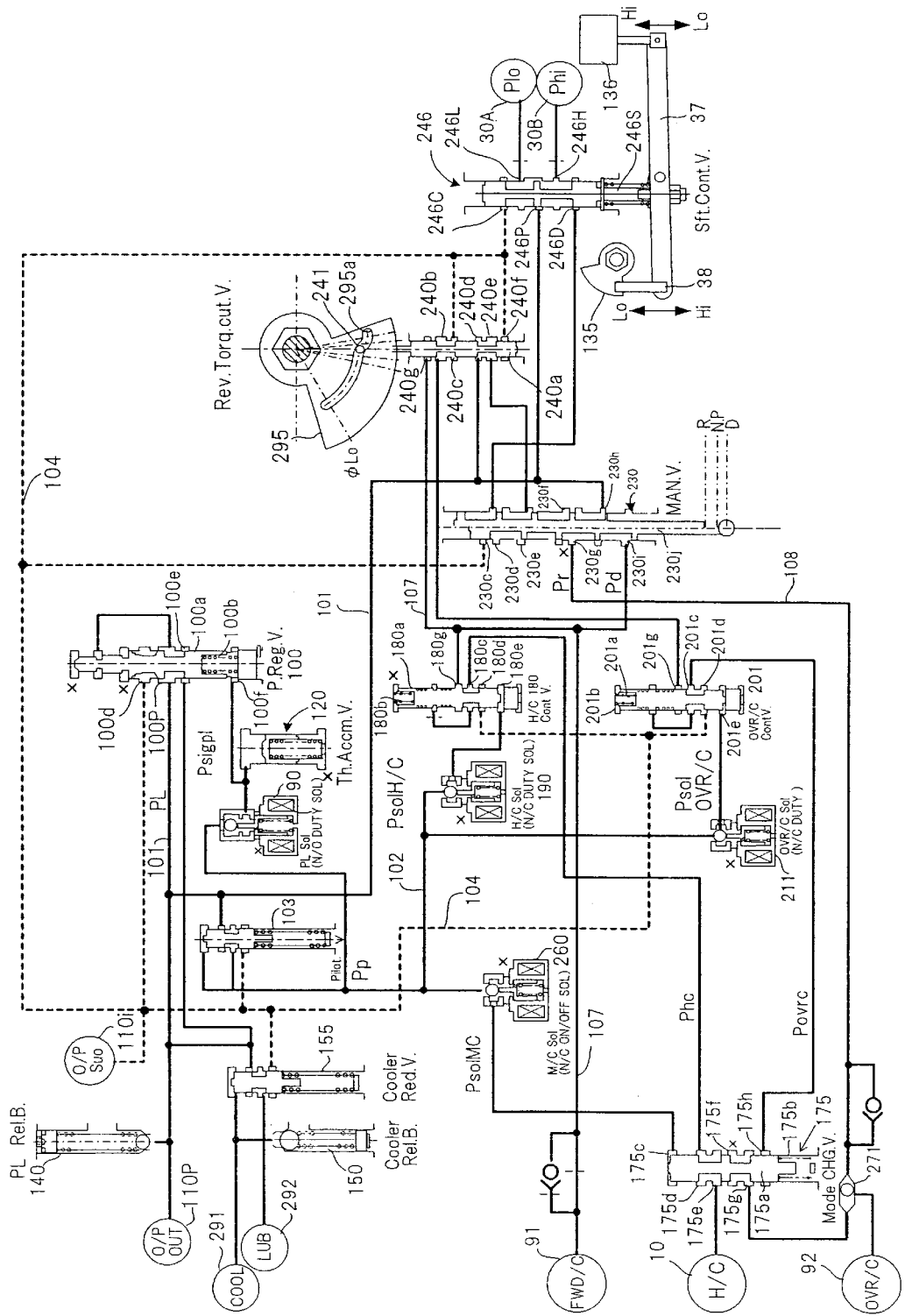
FIG. 4 is a diagram of a hydraulic circuit of a speed change controller.

The speed change link 37 is joined to a spool 246S of the shift control valve 246 in its center as shown in FIG. 4. The other end of the speed change link 37 which is joined to the feedback link 38, is joined to a step motor 136 (actuator). The speed change link 37 causes the shift control valve 246 (speed change control valve) to displace in an axial direction due to the drive of the step motor 136, and causes the spool 246S of the shift control valve 246 to displace in an axial direction according to the rotation and axial displacement of the trunnion 23.

The trunnion 23 is driven in an axial direction and gyrates the power roller 20 according to the drive position of the step motor 136. When a predetermined speed ratio (hereafter referred to as CVT ratio ic) is attained, an oil pressure of oil chambers 30A, 30B is adjusted to due to the action of the feedback link 38, and the CVT ratio ic (=unit input shaft rotation speed Ni/CVT output shaft rotation speed No) corresponding to the drive position of the step motor 136 is maintained.

By varying the CVT ratio ic, the overall speed ratio of the IVT=IVT ratio ii (unit input shaft rotation speed Ni/unit output shaft rotation speed Nout) is varied. The overall speed ratio is referred to as the IVT ratio ii, and the inverse of this IVT ratio ii is referred to as the IVT speed ratio e.

<2. Control Unit>

Figure 5:
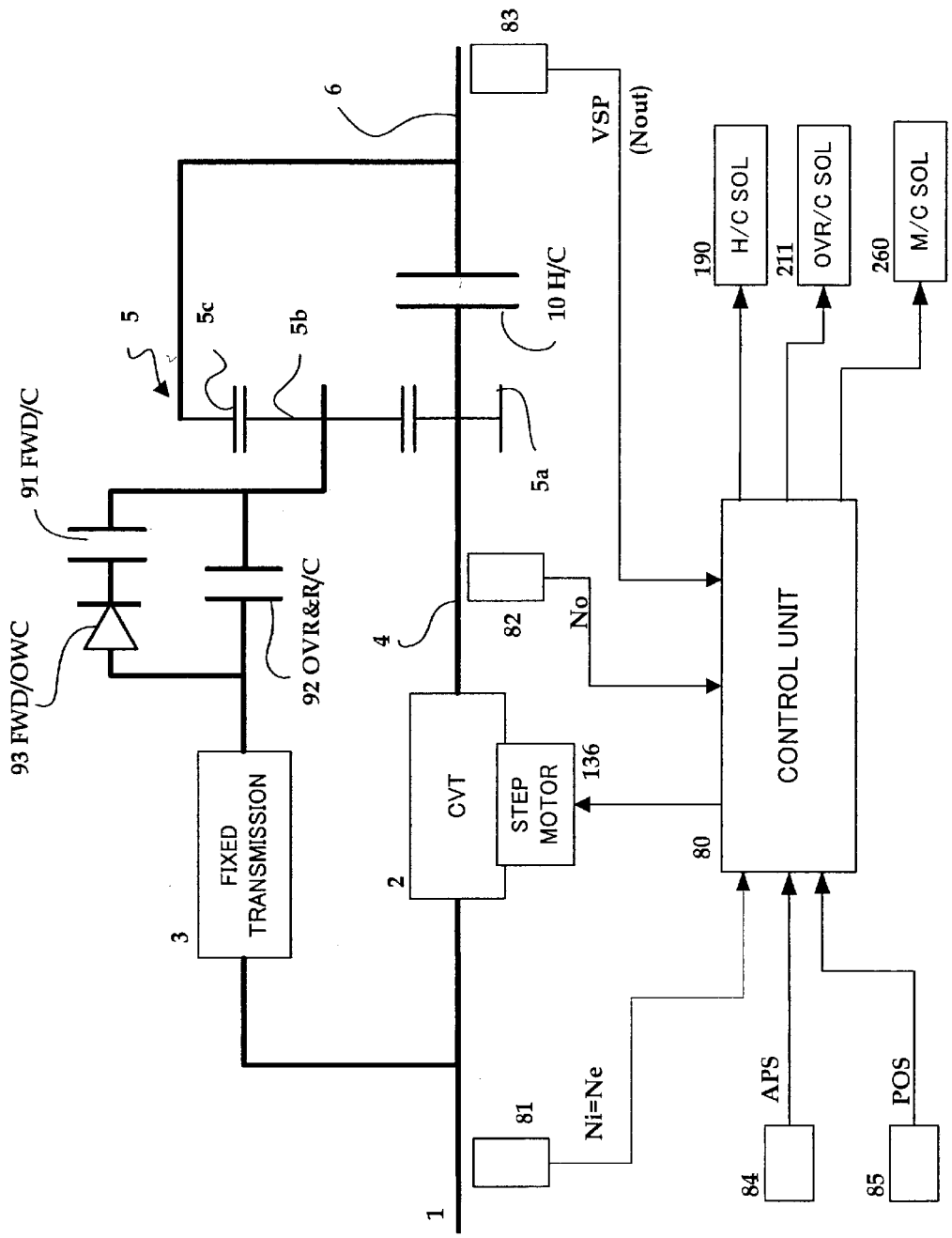
FIG. 5 is a control concept diagram of an IVT.

Next, to control the IVT, the speed ratio and torque transmission are controlled by a speed change control unit (clutch control unit) 80 essentially comprising a microcomputer, as shown in FIG. 5.

The inputs to the speed change control unit 80 comprise the output from an input shaft rotation speed sensor 81 which detects the rotation speed Ni of the unit input shaft 1 (=engine rotation speed Ne), CVT output shaft rotation speed sensor 82 which detects the rotation speed No of the CVT output shaft 4, vehicle speed sensor 83 which detects a vehicle speed VSP based on the rotation speed Nout of the unit output shaft 6, a selector position POS from an inhibitor switch 85 which responds to a selector lever or switch, not shown, and an accelerator pedal depression amount APS detected by an accelerator depression amount sensor 84.

The speed change control unit 80 processes these detected values as a running state, and selectively engages the FWD/C 91,H/C 10 and OVR&R/C 92 by driving a H/C solenoid 190, overrun clutch solenoid 211 and mode change-over solenoid 260 as actuators, as shown in FIG. 4, according to this running state. In this way, it changes over between a power recirculation mode and a direct mode, and drives the step motor 136 so that the unit speed ratio (IVT ratio) according to the running state is obtained.

In the IVT having the aforesaid construction, the running state can be selected according to the following table by selectively engaging the H/C 10 (second clutch device), FWD/C 91 and OVR&R/C 92.

TABLE 1

|  | R (REVERSE) | N or P | D (FORWARD) and L (POWER) | D and H (DIRECT) |
|---|---|---|---|---|
| FWD/C | X | X | O | O |
| OVR&R/C | O | X | B | X |
| H/C | X | X | X | O | where
O = engaging
X = release
B = engaged only above a predetermined vehicle speed in the power recirculation mode (L mode), and the driver requires engine braking (Ds range, M range).

In the N range or P range, the carrier 50 rotates idly according to the rotation of the sun gear 5a by disengaging the H/C 10, FWD/C 91 and OVR&R/C 92, so torque is not transmitted to the ring gear 5c.

Figure 9:
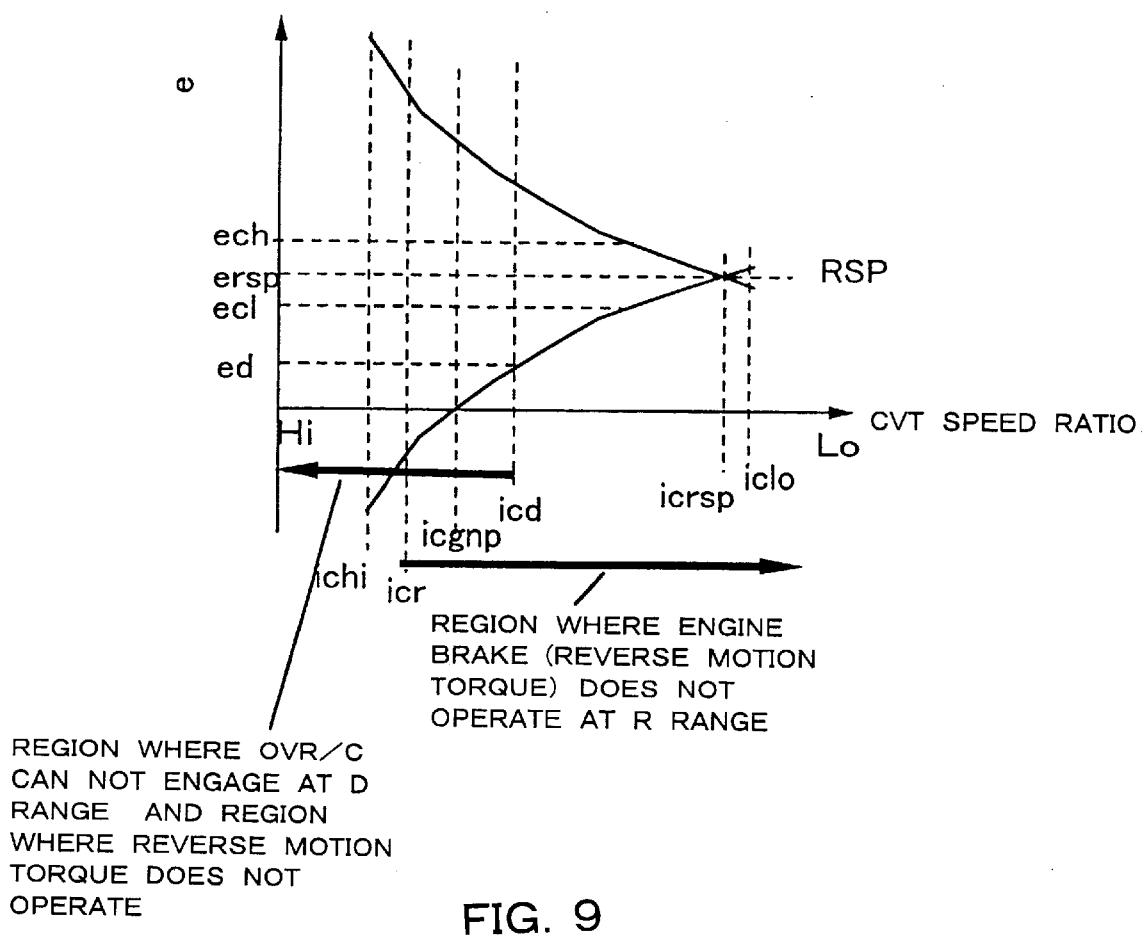
FIG. 9 is a map showing a relation between the CVT ratio ic and an IVT velocity ratio e.
Figure 17:
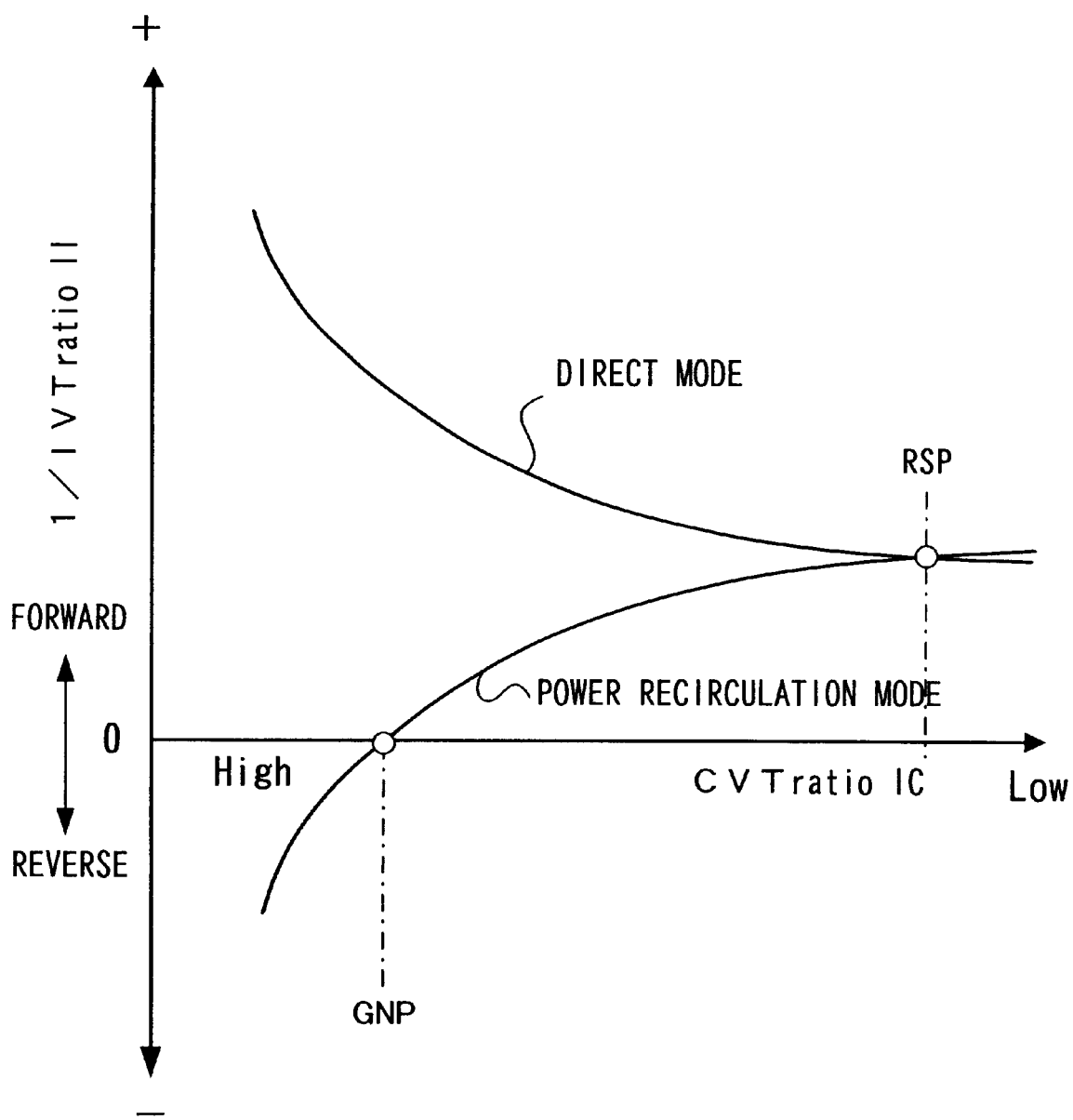
FIG. 17 is a map showing a relation between a speed ratio (CVT ratio) of the CVT and the inverse of a unit speed ratio (IVT ratio).

In the R range, which is the reverse range, only the OVR&R/C 92 of the three-way clutch unit 9 is engaged, so the carrier 50 engages with the fixed speed ratio transmission output shaft 3c, the torque which was transmitted to the sun gear 5a from the CVT 2 is transmitted partially to each of the pinion 5b and ring gear 5c, and the transmission functions in the reverse direction of the power recirculation mode where the IVT speed ratio e is negative, as shown in FIG. 9 and FIG. 17.

In this reverse direction of the power recirculation mode, part of the torque transmitted to the carrier 50 from the CVT 2, is input to the CVT 2 via the fixed speed ratio transmission output shaft 3c and fixed speed ratio transmission 3 from the overrun and reverse clutch 92, and from the unit input shaft 1, so torque is recirculated.

On the other hand, in the D range, which is the forward range, the engaging state of the clutches in the power recirculation mode (L in Table 1) and direct mode (H in Table 1) is different, as shown in FIG. 9 and FIG. 17.

First, in the power recirculation mode of the D range, by engaging only the FWD/C 91 of the three-way clutch unit 9, torque is transmitted from the fixed speed ratio transmission output shaft 3c to the carrier 50 via the FWD/OWC 93, and FWD/C 91. The IVT speed ratio e (or IVT ratio ii) is positive, and the CVT ratio ic and IVT speed ratio e can be controlled within a range from the geared neutral point GNP to the rotation synchronous point RSP, as shown in FIG. 9 and FIG. 17.

In this forward direction of the power recirculation mode, torque transmitted from the fixed speed ratio transmission output shaft 3c to the carrier 50 via the FWD/OWC 93 and FWD/C 91, is transmitted respectively to the ring gear 5c and sun gear 5a meshed with the pinion 5b, the vehicle moves forward under the torque transmitted to the ring gear 5c, the torque transmitted to the sun gear 5a is transmitted from the output side to the input side of the CVT 2, and is input to the fixed speed ratio transmission 3 via the unit input shaft 1 so that it is recirculated.

In the forward direction of the power recirculation mode, when only the FWD/C 91 is engaged, the torque in the direction from the carrier 50 to the fixed speed ratio transmission output shaft 3c (torque on the engine braking side) is interrupted by the FWD/OWC 93, so the engine brake does not operate.

Hence, when the driver requires engine braking, the OVR&R/C 92 is simultaneously engaged together with the one-way clutch 91, as shown by B in Table 1, and the torque on the engine braking side can be transmitted in addition to the torque on the drive side.

When engine braking is required, for example, the Ds range (sports range), M range (manual mode) or L range (low speed range) are selectively engaged by the inhibitor switch 85 shown in FIG. 4, and when these ranges are selected, the OVR&R/C 92 is engaged.

Next, in the D range, when the FWD/C 91 and H/C 10 are engaged, the direct mode is obtained wherein the CVT output shaft 4 and unit output shaft 6 are joined, torque is transmitted to the unit output shaft 6 according to the CVT ratio ic of the CVT 2, and speed change control is performed in a region where the IVT speed ratio e is greater than a rotation synchronous point ersp, as shown in FIG. 9 and FIG. 17.

In this direct mode, the sun gear 5a of the planetary gear set 5 and the pinion 5b rotate, and the carrier 50 is also driven, but in FIG. 9, above the IVT speed ratio ersp corresponding to the rotation synchronous point RSP, the rotation speed of the carrier 50 is higher than the rotation speed of the fixed speed ratio transmission output shaft 3c, and as the power transmission path from the carrier 50 to the fixed speed ratio transmission output shaft 3 is interrupted by the FWD/OWC 93, the carrier 50 merely rotates together with the sun gear 5a and ring gear 5c.

Therefore, in the direct mode, only the H/C 10 need to be engaged, however there is no disadvantage in engaging the FWD/C 91 of the three-way clutch unit 9, and in the D range which is the forward range, the FWD/C 91 is normally engaged.

In the forward range, if the FWD/C 91 is always engaged, the change-over between the power recirculation mode and direct mode can be made rapidly and easily by controlling the engaging state of the H/C 10, and the change-over control of running mode can be largely simplified compared to the case where the running mode is changed over by selectively engaging both the FWD/C 91 and H/C 10.

In the operation of the three-way clutch unit 9, firstly, when the FWD/C 91 is engaged, torque is transmitted only in the direction from the fixed speed ratio transmission output shaft 3c to the carrier 50 by the FWD/OWC 93 (first engaging state).

Next, when the OVR&R/C 92 is engaged, torque is transmitted to both the fixed speed ratio transmission output shaft 3c and carrier 50 regardless of the engaging state of the FWD/C 91 (second engaging state).

If both the FWD/C 91 and OVR&R/C 92 are disengaged, torque transmission between the fixed speed ratio transmission output shaft 3c and carrier 50 is interrupted (disengaged state).

<3. Control of Torque Transmission>

In the toroidal type CVT 2, in FIG. 3, a differential pressure $\Delta P$ applied to a piston 31 of the hydraulic cylinder 30 is the transmission torque of the power roller 20, accordingly the transmitted torque can be controlled by adjusting oil pressures Plo, Phi of the oil chambers 30A, 30B of the hydraulic cylinder 30.

When torque transmission is controlled by adjusting the differential pressure $\Delta P$, the shift control valve 246 may be changed over according to the direction of torque transmission supported by the hydraulic cylinder 30. For example, in FIG. 4, when a line pressure PL is supplied to the oil chamber 30B, if the input disk 21 is rotating, a positive torque (taking the direction of the torque transmitted from the input disk 21 to the output disk 22 as positive, hereafter idem), can be controlled by adjusting the oil pressure Plo of the oil chamber 30A, as shown in FIG. 3.

Conversely in FIG. 4, when the line pressure PL is supplied to the oil chamber 30A, if the input disk 21 is rotating, a negative torque (taking the direction of the torque transmitted from the output disk 22 to the input disk 21 as negative, hereafter idem), can be controlled by adjusting the oil pressure Phi of the oil chamber 30B, as shown in FIG. 3.

Here, in the IVT, the torque transmitted varies according to the engaging mode of the power recirculation mode and the direct mode and the traveling direction of the vehicle.

First, in the direct mode, as torque from the CVT 2 is transmitted to the unit output shaft 6, the vehicle is driven under a torque in the positive direction, and the engine brake is operated by a torque in the negative direction.

However, in the power recirculation mode, the direction of torque transmission passing through the CVT 2 is different when the vehicle is moving forward with the H/C 10 disengaged and only the FWD/C 91 engaged, and when the vehicle is reversing with only the OVR&R/C 92 engaged.

First, when the vehicle is moving forward in the power recirculation mode, if the rotation speed of the pinion of the carrier 50 is greater than the rotation speed of the sun gear 5a, i.e., when the CVT ratio ic of the CVT 2 is on the larger side (Low side) of the geared neutral point GNP shown in FIG. 17 and the torque transmitted to the carrier 50 is transmitted to the ring gear 5c and sun gear 5a, the torque input to the CVT 2 is input from the output disk 22 via the gear 4a, and has a negative direction. It may be noted that the torque transmitted from the output disk 22 to the input disk 21 is transmitted from the unit input shaft 1a to the fixed speed ratio transmission 3, and drive force is therefore recirculated.

On the other hand, when the vehicle is reversing in the power recirculation mode, if the rotation speed of the sun gear 5a is sufficiently larger than the rotation speed of the carrier 50, i.e., when the CVT ratio ic of the CVT 2 is on the smaller side (High side) of the geared neutral point GNP shown in FIG. 17 and the torque transmitted to the sun gear 5a is transmitted to the carrier 50 and ring gear 5c, the torque input to the CVT 2 is in the positive direction from the input disk 21 to the output disk 22, and the torque transmitted to the carrier 50 via the sun gear 5a is again recirculated to the input disk 21 via the fixed speed ratio transmission 3.

Therefore, when the vehicle is moving forward in the power recirculation mode, the transmitted torque on the drive side can be controlled by controlling the negative torque passing through the CVT 2, i.e., the differential pressure $\Delta P$ between the line pressure PL supplied to the oil chamber 30A and oil pressure Phi supplied to the oil chamber 30B may be controlled as shown in FIG. 3 and FIG. 4.

To control the engine brake when the vehicle is moving forward in the power recirculation mode, the positive torque passing through the CVT 2 may be controlled, so the OVR&R/C 92 is engaged in addition to the FWD/C 91, and a differential pressure $\Delta P$ between the line pressure PL supplied to the oil chamber 30B and oil pressure Plo supplied to the oil chamber 30A is controlled.

On the other hand, when the vehicle is reversing in the power recirculation mode, the above relations are reversed, i.e., the torque transmitted on the drive side can be controlled by controlling the positive torque passing through the CVT 2, and the differential pressure $\Delta P$ between the line pressure PL supplied to the oil chamber 30B and oil pressure Plo supplied to the oil chamber 30A may be controlled.

Likewise, to control engine braking when the vehicle is reversing, the negative torque may be controlled, so the differential pressure $\Delta P$ between the line pressure PL supplied to the oil chamber 30A and the oil pressure Phi supplied to the oil chamber 30B is controlled as in the case when the vehicle is moving forward in the power recirculation mode.

Next, each component of the hydraulic circuit in FIG. 4 will be described.

<4-1 Line Pressure and Lubricating Pressure Control System>

In FIG. 4, a discharge port 110p of an oil pump 110 is led to a line pressure port 100p of a pressure regulator 100 via a line pressure circuit 101, and a signal pressure Psigpl from a line pressure solenoid 90 is connected to a port 100f of the pressure regulator valve 100.

A spool 100a displaces so that the oil pressure from the discharge port 110p balances the force due to this signal pressure Psigpl and the pushing force of a spring 100b, and the line pressure PL of a line pressure circuit 101 connected to the line pressure port 100p is controlled to a predetermined value.

The line pressure solenoid 90 is controlled by the speed change control unit 80, and the signal pressure is adjusted as an original pressure of a pilot pressure Pp from a pilot pressure circuit 102. A pilot valve 103 adjusts this pilot pressure Pp in direct proportion to the line pressure PL from the pressure regulator valve 100. An accumulator 120 is interposed between the line pressure solenoid 90 and port 100f.

An intake port 110i of an oil pump 110 is connected to a pump intake oil passage 104. When the line pressure PL increases, a second drain port 100d of the pressure regulator valve 100 which communicates with this pump intake oil passage 104, communicates with the line pressure port 100p, and increase of the line pressure PL is thereby suppressed. When the line pressure PL exceeds the predetermined value, a relief valve 140 operates to decompress the line pressure circuit 101.

A first drain port 100e is at a supply pressure of a cooler reducing valve 155, and the control pressure of the cooler reducing valve 155 is connected to a cooler port 291.

The cooler reducing valve 155 prevents the cooler supply pressure from increasing beyond a fixed value, and protects the cooler pipe system. Further, if the cooler reducing valve 155 sticks, a cooler relief valve 150 which operates even more rapidly is controlled by the control pressure of the cooler reducing valve 155 to prevent abnormal rise of cooling system pressure.

The control pressure of the cooler reducing valve 155 is connected to a lubrication port 292 via the cooler port 291 and an orifice, and is supplied to each part of the IVT to perform lubrication and cooling.

A manual valve 230 which responds to a shift lever, not shown, a reverse torque shutoff valve 240 which responds to the gyration angle φ of the trunnion 23, and the shift control valve 246 which responds to the step motor 136 and precess cam 135 via the speed change link 37, are connected to the line pressure circuit 101 whereof the pressure is adjusted by the pressure regulator valve 100.

The step motor 136 drives the speed change link 37 so that the CVT ratio ic is on the small side (High side) when the step number is reduced, and drives the speed change link 37 so that the CVT ratio ic is on the large side (Low side) when the step number is increased.

Also, the relation between the rotation direction of the cam surface 135A of the precess cam 135 and the drive direction of the feedback link 38, is such that in FIG. 3, when the precess cam 135 rotates to the large side (Low side) of the CVT ratio ic, one end 38a of the feedback link 38 displaces downwards in the figure, and when the precess cam 135 rotates to the small side (High side) of the CVT ratio ic, the end 38a of the feedback link 38 displaces upwards in the figure so as to drive the speed change link 37 engaged with the other end.

<4-2 Shift Control Valve>

Next, in FIG. 4, the shift control valve 246 comprises a supply port 246P which communicates with the line pressure circuit 101, a Low side port 246L which communicates with the oil chamber 30A of the hydraulic cylinder 30, and a High side port 246H which communicates with the oil chamber 30B of the hydraulic cylinder 30, and the line pressure PL is supplied to one of the Low side port 246L or High side port 246H according to the displacement of the spool 246S connected to the speed change link 37. The other port is connected to one of discharge ports 246C, 246D.

The discharge port 246C which can communicate with the Low side port 246L, communicates with the pump intake passage 104 and a port 240f of the reverse torque shutoff valve 240. Likewise, the port 246D which can communicate with the High side port 246H, is connected with a port 230d of the manual valve 230.

<4-3 Manual Valve>

Figure 6:
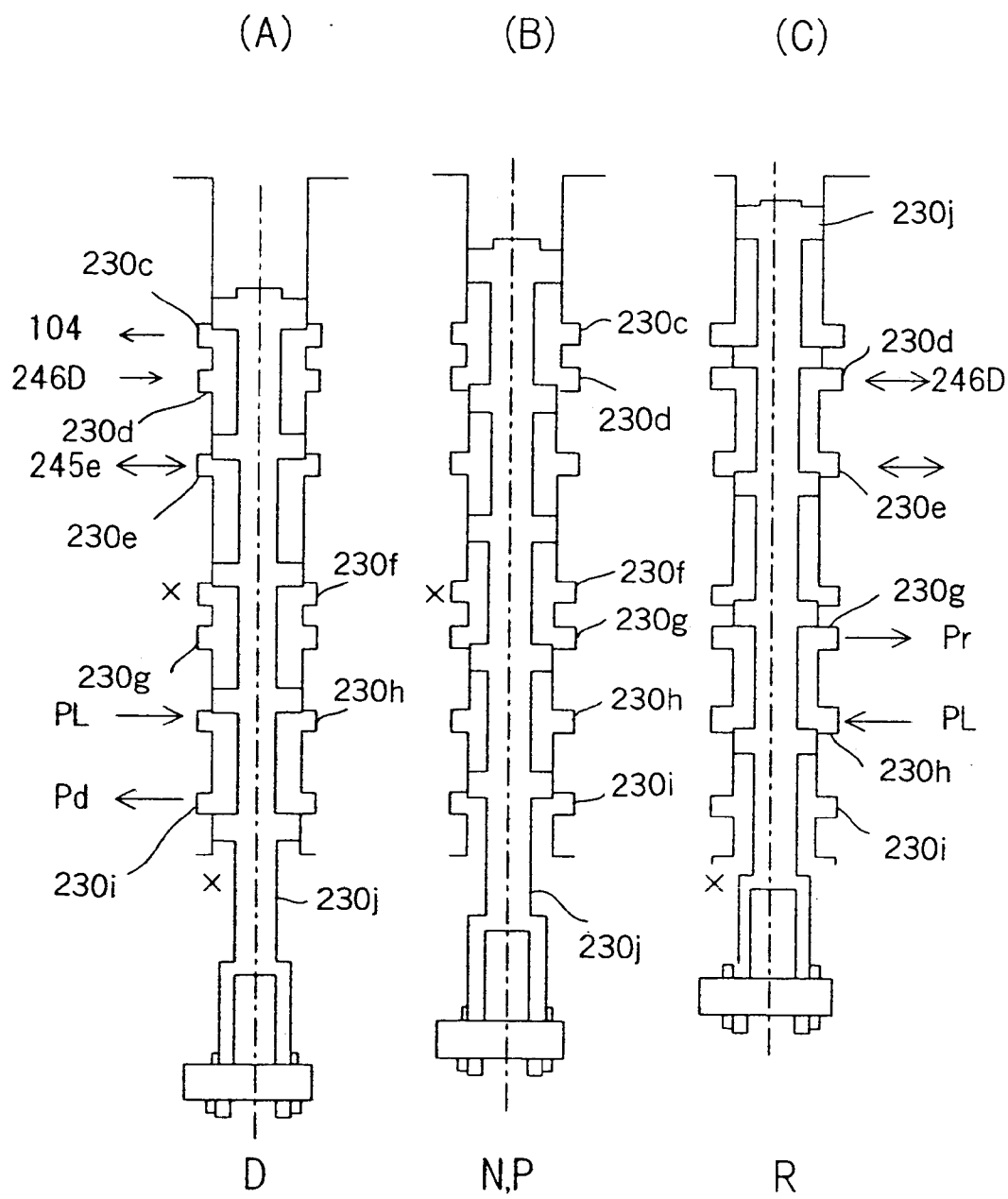
FIG. 6 shows a manual valve. (A) shows a relation between a spool and a port for a D range, (B) for a N range or P range and (C) for an R range.

Next, a spool 230j of the manual valve 230 is driven by a cam, etc., not shown, which rotates according to a select lever, etc., shown in FIG. 6(D), and is set to one of three positions, i.e., the D range which is the forward range, R range which is the reverse range, or N or P range which are vehicle stop ranges, as shown in FIGS. 6(A)–(C).

Specifically, when the D range is selected, the spool 230j is situated in the lowermost part of the figure as shown in FIG. 6(A), and when the R range is selected, the spool 230j is situated in the uppermost part of the figure as shown in FIG. 6(C).

In the N range or P range, the spool 230j displaces to a position between the D range and N range, as shown in FIG. 6(B).

{At D Range Selection}

When a forward range such as the D range or Ds range which is used for sporty driving is selected, the spool 230j displaces to the uppermost position of the figure shown in FIG. 4 and FIG. 6(A), a line pressure port 230h which communicates with the line pressure circuit 101 is connected with a D range pressure port 230i, and the line pressure PL is supplied to a D range pressure circuit 107 (first hydraulic supply device).

When the D range is selected, in FIG. 4, the line pressure PL is supplied from the D range pressure circuit 107 to both a H/C control valve 180 (third hydraulic supply device) and the FWD/C 91. Further, the D range pressure circuit 107 supplies the line pressure PL to a port 240g of the reverse torque shutoff valve 240 which responds to the gyration angle φ of the trunnion 23.

When the gyration angle φ has fallen to less than a predetermined value, as described later, the spool 240a of the reverse torque shutoff valve 240 displaces to the upper part of FIG. 4, this port 240g communicates with a port 240b, the line pressure PL from the D range pressure circuit 107 is supplied to an OVR&R/C control valve 201 (second hydraulic supply device) to permit engaging of the OVR&R/C 92, and the operation of the engine brake when the vehicle is moving forward in the D range is enabled.

The R range pressure port 230g which communicates with an R range pressure circuit 108, is connected to a drain port 230f, and supply of oil pressure from the R range pressure circuit 108 to the OVR&R/C 92 connected to the R range pressure circuit 108 via a shuttle valve 271, is shut off.

Further, in the D range, the manual valve 230 connects the port 230d communicating with the discharge side port 246D of the shift control valve 246 to the pump intake oil passage 104 via a port 230c.

A port 230e of the manual valve 230 which communicates with a port 240e of the reverse torque shutoff valve 240, is sealed in the D range.

{At N Range or P Range Selection}

When the N range or P range, which are stop ranges, are selected, as shown in FIG. 6(B), the spool 230j displaces to effectively the middle of a full stroke, the line pressure port 230h is sealed, the D range pressure port 230i is opened to the atmosphere to drain from the lower part of the figure, the R range pressure port 230g is connected to the drain port 230f, the D range pressure circuit 107 and R range pressure circuit 108 are both drained, and supply of the line pressure PL to the H/C control valve 180, OVR&R/C control 201 and FWD/C 91 is shut off. This disengages the FWD/C 91, H/C 10 and OVR&R/C 92, and torque transmission from the unit input shaft 1 to the unit output shaft 6 is interrupted.

{At Reverse Range Selection}

When the R range, which is the reverse range, is selected, as shown in FIG. 6(C), the spool 230j displaces to the upper part of the figure, the R range pressure port 230g is made to communicate with the line pressure port 230h, and the D range pressure port 230i is opened to the atmosphere to drain from the lower part of the figure.

As a result, the line pressure PL is applied from the R range pressure port 230g to the R range pressure circuit 108, so the valve body of the shuttle valve 271 moves to the left in FIG. 4, and the OVR&R/C 92 is engaged.

On the other hand, the oil pressure of the D range pressure circuit 107 is drained from the port 230i, so the FWD/C 91 is disengaged, the original pressures of a H/C control valve 180d and the OVR&R/C control valve 201 are both shut off, and the H/C 10 is disengaged.

The port 230d which communicates with the discharge side port 246D of the shift control valve 246, communicates with the port 240e of the reverse torque shutoff valve 240 via the port 230e, and the oil chamber 30B of the hydraulic cylinder 30 then communicates with the port 240e of the reverse torque shutoff valve 240.

<4-4 Clutch Control Valves>

Next, a pilot pressure control circuit 102 of which the pressure is adjusted by a pilot valve 103, supplies the pilot pressure Pp to the H/C solenoid 190 which controls the H/C 10, the OVR&R/C solenoid 211 which controls the OVR&R/C 92, and the mode change-over solenoid 260 which controls the mode change-over valve 175 (engaging state control device).

The H/C solenoid 190, OVR&R/C solenoid 211 and mode change-over solenoid 260 are duty-controlled by the speed change control unit 80, as shown in FIG. 4.

A signal pressure PsolH/C adjusted by the H/C solenoid 190, is supplied to a port 180e of the H/C control valve 180.

A signal pressure PsolOVR/C adjusted by the OVR&R/C solenoid 211, is supplied to a port 201e of the OVR&R/C control valve 201.

The H/C control valve 180 drives the spool 180a according to the signal pressure PsolH/C supplied to the port 180e, decompresses a D range pressure Pd (the line pressure PL) from the D range pressure circuit 107 supplied to the port 180g, and supplies this to the mode change-over valve 175 as a control pressure Phc from an output port 180c. The port 180d is connected to the pump intake pressure path 104.

Figure 12:
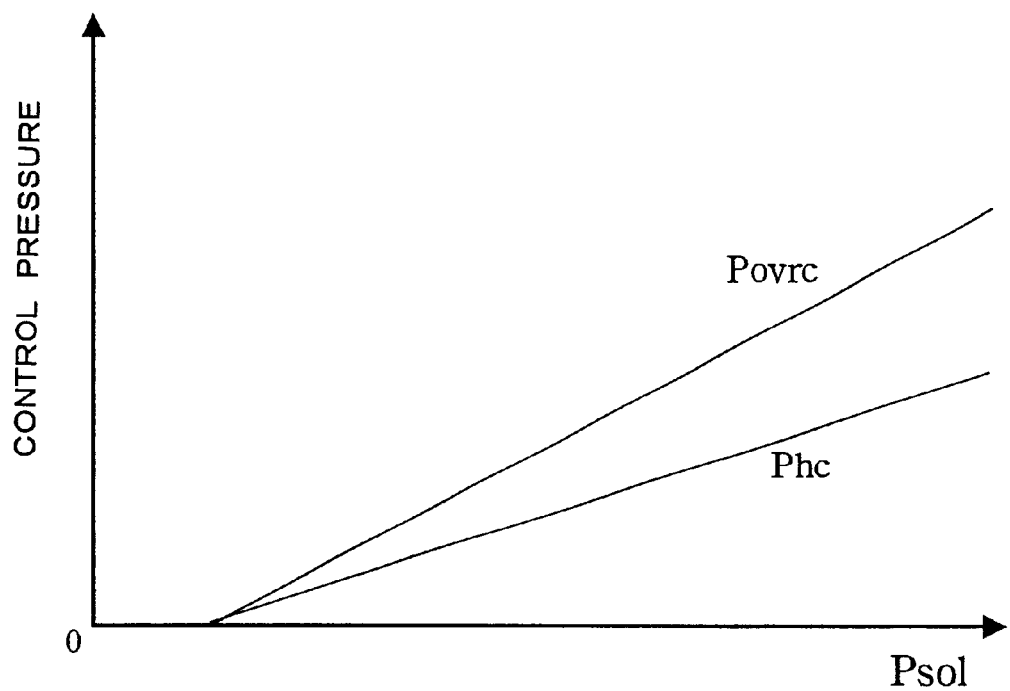
FIG. 12 is a graph showing a relation between signal pressure and control pressure.

The signal pressure PsolH/C pushes the spool 180a against a spring 180b and the D range pressure Pd, and the signal pressure Phc increases as shown in FIG. 12 according to the increase of the signal pressure PsolH/C.

When the signal pressure PsolH/C is 0, the H/C control valve 180 makes the port 180c communicate with the port 180d, and releases the control pressure Phc.

Likewise, the OVR&R/C control valve 201 drives the spool 201a according to the signal pressure PSolOVR/C supplied to the port 201e, decompresses an R range pressure Pr (the line pressure PL) from the R range pressure circuit 108 supplied to the port 201g, and supplies this to the mode change-over valve 175 as a control pressure Povrc from an output port 201c. A port 201d is connected to the pump intake oil passage 104.

The signal pressure PsolOVR/C pushes the spool 201a against a spring 201b and the R range pressure Pr, and the control pressure Povrc increases as shown in FIG. 12 according to the increase of the signal pressure PsolOVR/C.

When the signal pressure PsolOVR/C is 0, the OVR&R/C control valve 201 makes the output port 201c communicate with the port 201d by the pushing force of the spring 201b, and the control pressure Povrc is discharged to the pump intake oil passage 104.

<4-5 Mode Change-over Valve>

The control pressure Phc and control pressure Povrc supplied from the H/C control valve 180 and OVR&R/C control valve 201, are supplied respectively to the OVR&R/C 92 and H/C 10 via the mode change-over valve 175 comprising a spool 175a which responds to a signal pressure PsolMC from the mode change-over solenoid 260.

The output port 180c of the H/C control valve 180, and output port 201c of the OVR&R/C control valve 201, are respectively connected with ports 175d, 175h of the mode change-over valve 175.

A port 175e of the mode change-over valve 175 communicates with the H/C 10, and a port 175g communicates with the OVR&R/C 92 via the shuttle valve 271. A port 175f formed between these ports 175e, 175g is drained, and one of the control pressures Phc supplied to the H/C 10 and the control pressure Povrc supplied to the OVR&R/C 92, is supplied according to the displacement of the spool 175a.

For this purpose, an oil chamber 175c which receives the signal pressure PsolMC from the mode change-over solenoid 260, is formed at the end of the spool 175a of the mode change-over valve 175, and the signal pressure PsolMC pushes the spool 175a against a spring (or elastic member) 175b.

When the signal pressure PsolMC is 0, as shown in FIG. 4, the spool 175a is pushed by the spring 175b displacing it to the upper part of the figure, the port 175d communicates with the port 175e and the signal pressure Phc is supplied to the H/C 10, while the ports 175g, 175f are made to communicate and the oil pressure supplied to the shuttle valve 271 is drained.

On the other hand, when the signal pressure PsolMC is a maximum, in FIG. 4, the spool 175a is pushed by the spring 175b displacing it to the lower part of the figure, the port 175g communicates with the port 175h and the control pressure Povrc is supplied to the OVR&R/C 92 via the shuttle valve 271, while the ports 175e, 175f are made to communicate and the H/C 10 is drained and disengaged.

<4-6 Reverse Torque Shutoff Valve>

Next, in FIG. 4 and FIG. 7, the reverse torque shutoff valve 240 connected to the manual valve 230 and shift control valve 246, will be described.

A spool 240a of the reverse torque shutoff valve 240 comprises a pin 241 which engages with a cam groove 295a of a cam 295 connected to the trunnion 23, and displaces according to the gyration angle $\phi$ of the power roller 20.

Due to the displacement of the spool 240a, the port 240e which communicates with the port 230e of the manual valve 230, is made to communicate with one of a pressure port 240d connected to the line pressure circuit 101, and the port 240f connected to the pump intake oil passage 104 and discharge port 246C of the shift control valve 246, while at the same time, the port 240b which communicates with the OVR&R/C control valve 201 is made to communicate with one of the port 240g connected to the D range pressure circuit 107, and a port 240c connected to the pump intake oil passage 104.

Figure 7:
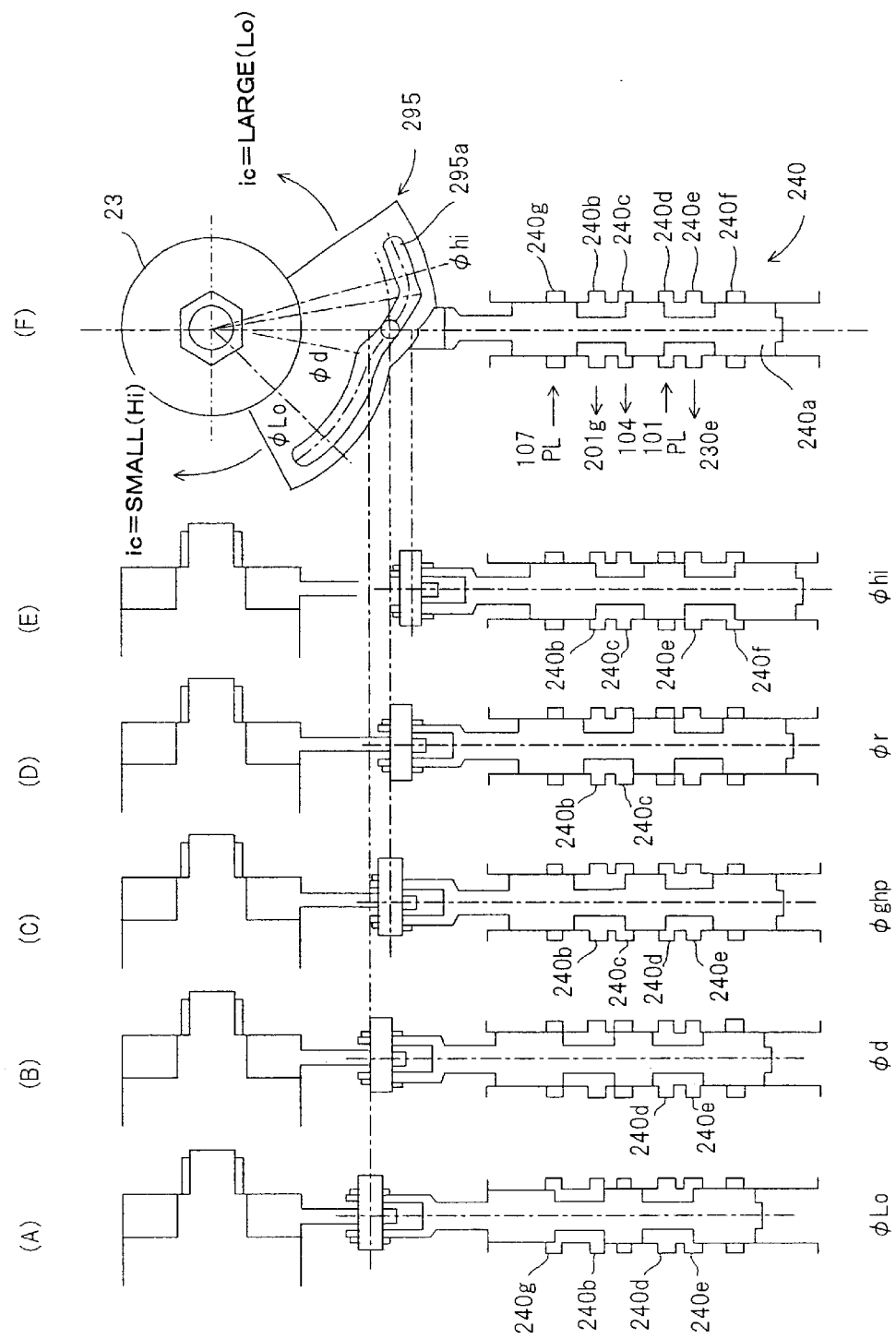
FIG. 7 is a schematic diagram of a reverse torque control valve according to a cam position. (A) shows a situation when a gyration angle is ϕlo, (B) when the gyration angle is ϕd, (C) when the gyration angle is ϕgnp, (D) when the gyration angle is ϕr and (E) when the gyration angle is ϕhi. (F) shows a relation between the cam and spool.

As shown in FIG. 4 and FIG. 7, a pin 241 which engages with the cam groove 295a is formed at one end of the spool 240a of the reverse torque shutoff valve 240. When the CVT ratio ic varies towards the large side (Low side), the trunnion 23 and cam 295 rotate in the anticlockwise direction of the figure, and when the CVT ratio ic varies towards the small side (High side), the trunnion 23 and cam 295 rotate in the clockwise direction of the figure.

Figure 8:
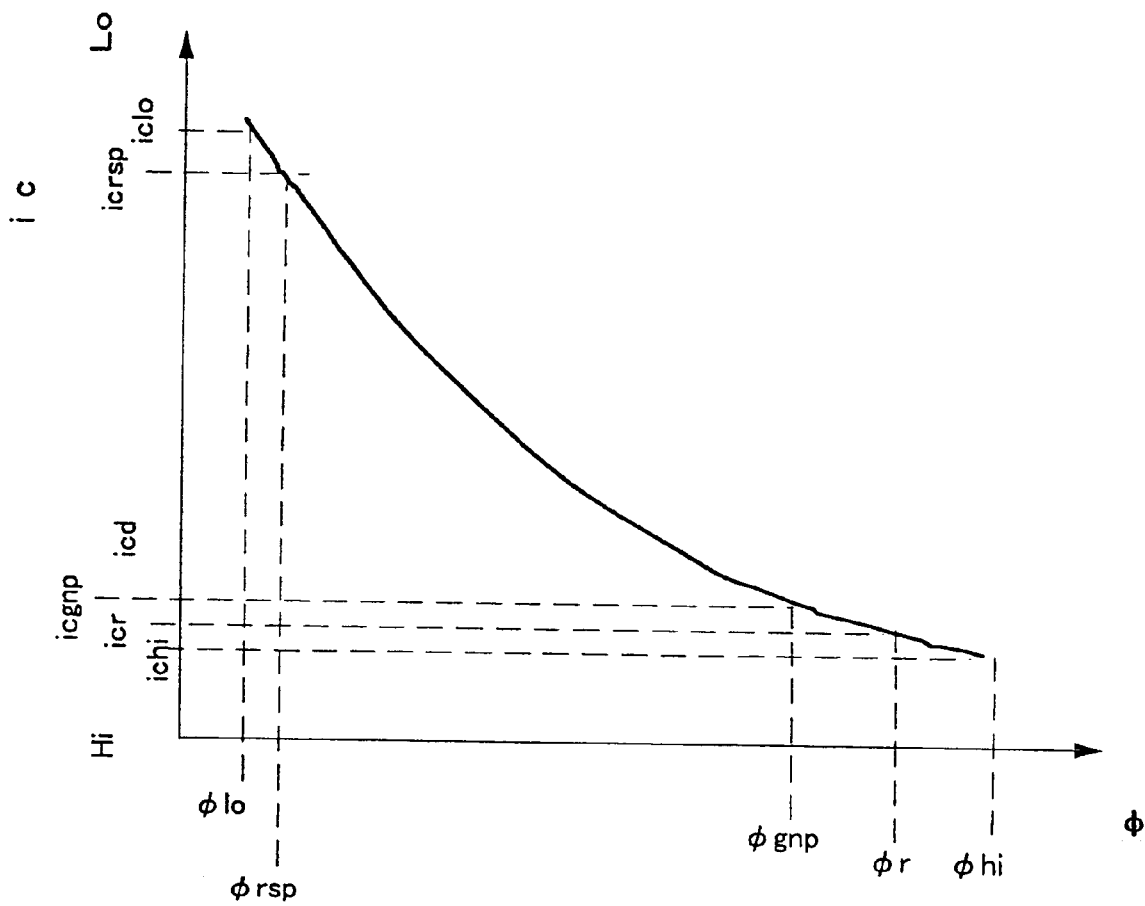
FIG. 8 is a map showing a relation between a gyration angle ϕ and a CVT ratio ic.

The cam groove 295a formed in the cam 295 drives the spool 240a between the gyration angle $\phi$r set larger than a gyration angle φgnp corresponding to the geared neutral point GNP, and a gyration angle φd set smaller than the gyration angle φgnp, i.e., in a range extending from φd to φr including φgnp, and in a region less than the gyration angle φd or exceeding the gyration angle φr, the spool 240*a* is fixed, as shown in FIG. 7 to FIG. 9.

At the gyration angle φgnp (=CVT ratio icgnp) corresponding to the geared neutral point GNP, as shown in FIG. 4 and FIG. 7(C), the spool 240*a* driven by the cam groove 295*a* is situated effectively in the middle of a stroke, the port 240*b* communicates with the port 240*c,* and the port 201*g* of the OVR&R/C control valve 201 is connected with the pump intake oil passage 104, while at the same time, the line pressure port 240*d* communicates with the port 240*e,* and the line pressure PL is supplied to the port 230*e* of the manual valve 230.

When the CVT ratio ic varies to the large side (Low side) of the geared neutral point GNP, the gyration angle decreases from φgnp towards φd, as shown in FIG. 8, and the cam 295 rotates in an anticlockwise direction in FIG. 4 and FIG. 7(F).

The cam groove 295*a* is formed so as to displace the spool 240*a* towards the upper part of the diagram at this time, and when the gyration angle varies towards a large CVT ratio ic from φgnp to φd, the spool 240*a* displaces to the position of FIG. 7(B).

In the position where the gyration angle is φd, the port 240*b* which had communicated with the port 240*c* is sealed while the port 240*e* continues to communicate with the line pressure port 240*d,* and when the gyration angle becomes less than φd, the port 240*b* communicates with the port 240*g,* and the port 201*g* of the OVR&R/C control valve 201 connects with the D range pressure circuit 107.

Further, when the CVT ratio ic varies towards the large side, the spool 240*a* displaces further upwards, and is held in a position where the seal properties of the port 240*b* and port 240*c* are maintained, as shown in FIG. 7(A). Subsequently, it does not move upwards from the position in FIG. 7(A) even if the gyration angle varies to the minimum value φlo (CVT ratio is iclo) used in the control, so increase in the total length of the reverse torque shutoff valve 240 is suppressed.

On the other hand, when the CVT ratio ic varies towards the small side (High side) from the geared neutral point GNP, the gyration angle increases from φgnp towards φd, as shown in FIG. 8, and the cam 295 rotates in the clockwise direction in FIG. 4 and FIG. 7(F).

The cam groove 295*a* is formed so as to displace the spool 240*a* towards the lower part of the figure at this time, and when the gyration angle varies towards a small CVT ratio ic from φgnp to φr, the spool 240*a* displaces to the position of FIG. 7(D).

In the position where the gyration angle is φr, the port 240*e* is shut off from the line pressure port 240*d* and sealed while the port 240*b* continues to communicate with the port 240*c,* and when the gyration angle exceeds φr, the port 240*e* communicates with the port 240*f,* and the port 230*e* of the manual valve 230 is connected to the pump intake oil passage 104.

Further, when the CVT ratio ic varies towards the small side, the spool 240*a* displaces further downwards, and is held in a position where the seal properties of the line pressure port 240*d* and port 240*e* are maintained, as shown in FIG. 7(E). Subsequently, it does not move downwards from the position in FIG. 7(E) even if the gyration angle varies to the maximum value φhi (CVT ratio is ichi) used in the control, so increase in the total length of the reverse torque shutoff valve 240 is suppressed.

<5. Operation>

Next, the operation will be described according to each running state.

{5.1 Forward Motion of Vehicle With N-D Select and Power Recirculation (L) Mode}

When there is a change-over from a stationary range to a forward range, the D range pressure (line pressure PL) is further supplied from the manual valve 230 to the D range pressure circuit 107 and the FWD/C 91 is engaged, thus establishing the power recirculation mode.

At this time, only the torque on the drive side (forward motion side) is transmitted in the power recirculation mode by the action of the FWD/OWC 93, and the torque on the engine brake side is not transmitted, as was described above.

Therefore, when the vehicle is moving in the forward direction in this power recirculation mode, torque is not produced on the engine brake side (reverse motion side) even if the CVT ratio ic varies towards the reverse side due for example to a fault of the speed change control unit 80.

In the release state of the accelerator pedal (APS=0), the step motor 136 is driven in the forward direction (large side of the CVT ratio ic) as shown in FIG. 9 and FIG. 17 in order to obtain a predetermined creep torque.

Figure 10:
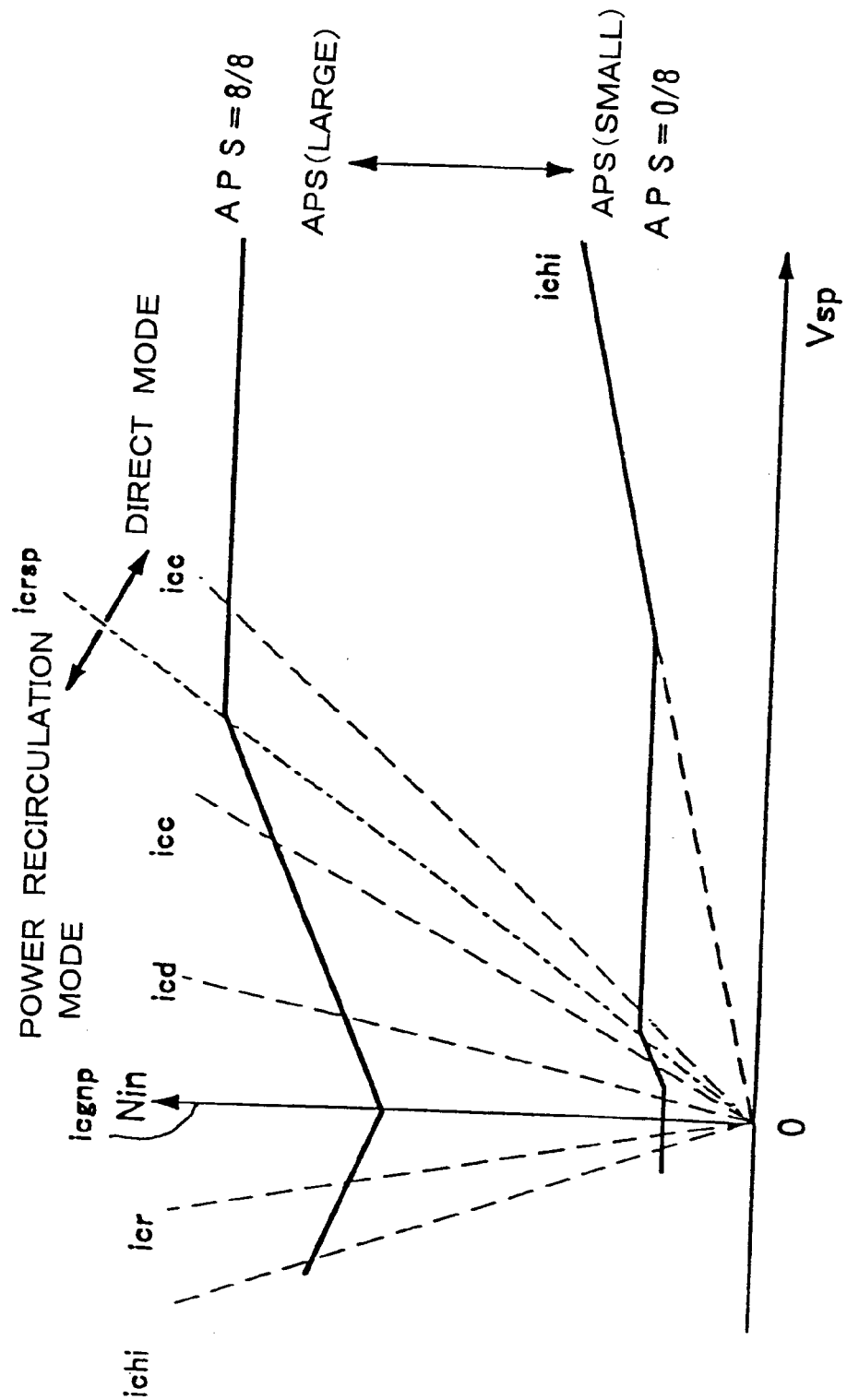
FIG. 10 is a map of a target input shaft rotation speed Nin according to a vehicle speed VSP and an accelerator depression amount APS. The wavy line in the figure shows the CVT ratio ic.

When the accelerator pedal is depressed, the ordinary CVT ratio ic is controlled so that a predetermined input shaft rotation is achieved relative to the vehicle speed VSP, and the accelerator pedal depression amount APS and a target input shaft rotation speed according to the vehicle speed VSP are determined as shown by the speed change map in FIG. 10, for example.

In the speed change map of FIG. 10, [target input shaft rotation speed Nin]/[CVT output shaft rotation speed No] shows a target CVT ratio ic, and the running mode is also determined based on a CVT ratio icrsp corresponding to the rotation synchronous point RSP, target CVT ratio and vehicle speed VSP. In this map, the change-over of running mode is shown for the case where it is performed at the CVT ratio icrsp corresponding to the rotation synchronous point RSP.

Figure 11:
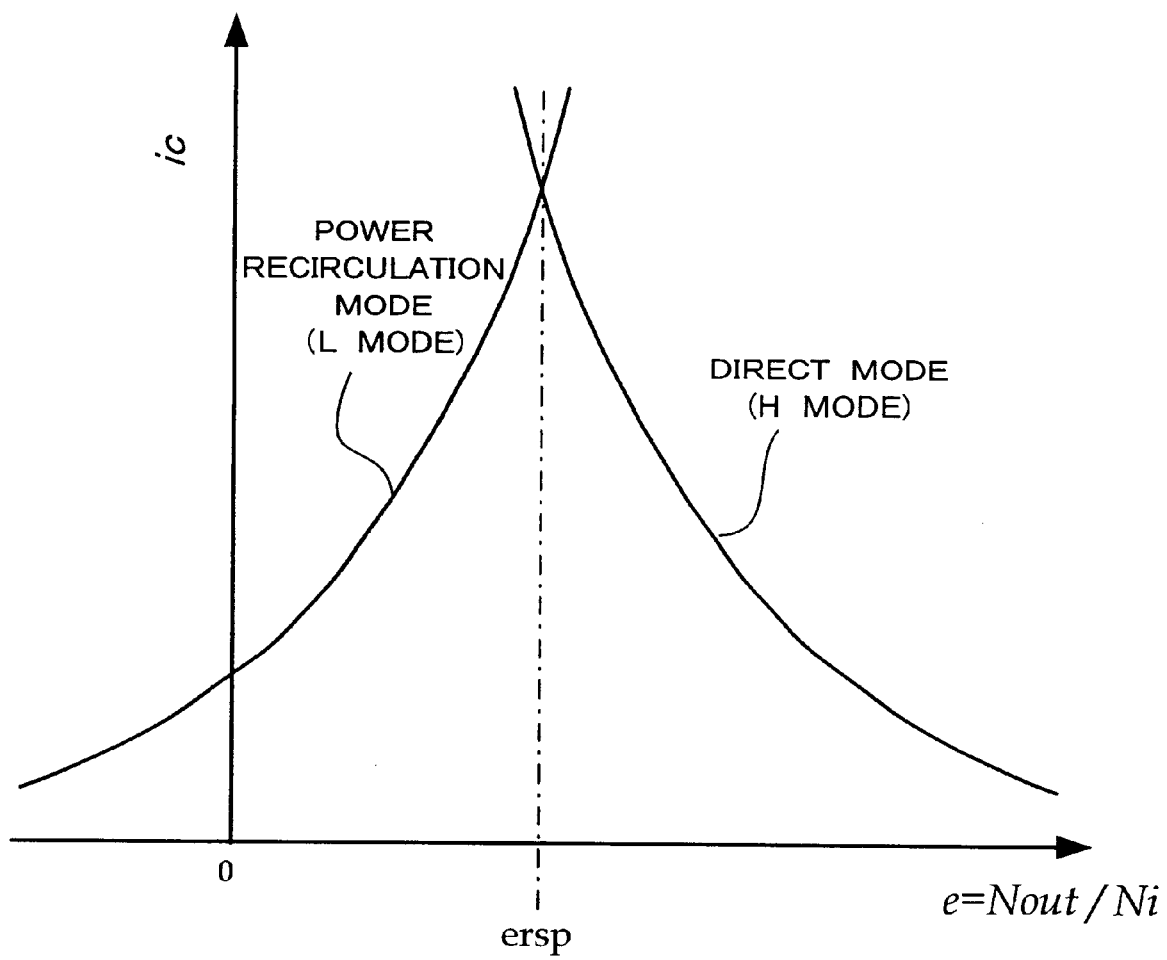
FIG. 11 is a map of a running mode according to the IVT speed ratio e and the CVT ratio ic.

The unit output shaft rotation speed Nout is then divided by this target input shaft rotation speed Nin to compute a target IVT speed ratio e=Nout/Nin, and the target CVT ratio ic is computed taking account of the running mode from the map of FIG. 11.

Subsequently, the target gyration angle φ is computed based on the map of FIG. 8 from the target CVT ratio ic, and the position of the step motor 136 is controlled relative to the target gyration angle.

In the D range of this power recirculation mode, if the mode change-over solenoid 260 is energized (ON), and the signal pressure PsolMC is generated, the spool 175*a* of the mode change-over valve 175 displaces downwards in FIG. 4, and the port 175*e* connects with the drain port 175*f.* Hence, the H/C 10 does not engage even if the control pressure Phc is produced due for example to a fault of the speed change control unit 80, and therefore an unintended speed change towards the rotation synchronous point RSP as occurred in the prior art is prevented.

On the other hand, when the vehicle is moving forward in the power recirculation mode and the engine brake is required, for example when the driver selects the Ds range, if the vehicle speed is greater a predetermined vehicle speed (of the order of 10 km/h), the OVR&R/C solenoid 211 is energized, the control pressure Povrc is generated, the mode change-over solenoid 260 is also energized to generate the signal pressure PsolMC which is supplied to the mode change-over valve 175, the spool 175*a* is pushed downwards in FIG. 4, and the signal pressure Povrc is supplied from the shuttle valve 271 from the port 175h via the port 175g to engage the OVR&R/C 92.

However, in any running range, in the very low vehicle speed region (of the order of 10 km/h or less), the OVR&R/C 92 is disengaged to prevent torque on the engine brake side from being transmitted.

The disengaging of the OVR&R/C 92 may also be performed by only interrupting energization of the mode change-over solenoid 260, and when the signal pressure PsolMC is 0, the spool 175a is pushed by the spring 175b to displace upwards in FIG. 4, the port 175g is made to communicate with the port 175f, and the oil pressure of the OVR&R/C 92 is drained.

The determination of whether to disengage the OVR&R/C 92 may also be made at less than the predetermined vehicle speed, or when the IVT speed ratio e (or IVT ratio ii) is a speed ratio corresponding to first gear of the planetary gear type automatic transmission, or has reached approximately the lowest speed ratio of the CVT equipped with torque converter. Thus, by controlling the OVR&R/C 92, transmission of engine brake torque in the very low vehicle speed region is prevented, and excessive engine braking due for example to a fault of the speed change control unit 80 is suppressed.

The port 201g which supplies the original pressure to the OVR&R/C control valve 201 is connected to the port 240b of the reverse torque shutoff valve 240, and the D range pressure Pd from the port 240g is selectively received according to the position of the spool 240a.

As a result, as shown from FIG. 7 to FIG. 9, when the gyration angle φ is larger than φd (CVT ratio ic is further on the High side than icd), the port 240b which is at the original pressure of the OVR&R/C control valve 201 is connected to the pump intake oil passage 104 via the port 240c, and drained, as shown in FIG. 7(C). Hence, the control pressure Povrc is not generated, and the OVR&R/C 92 is disengaged so that torque is not transmitted to the engine brake side.

Specifically, even if the speed change control unit 80 develops a fault while the vehicle is moving forward in the power recirculation mode, the step motor 136 is driven to the High side of the CVT ratio ic relative to the geared neutral point GNP, the OVR&R/C solenoid 211 is energized above the gyration angle φd (below the CVT ratio icd), the original pressure (D range pressure Pd) of the OVR&R/C 92 is shut off by the reverse torque shutoff valve 240 in response to the cam 295, and unintended speed change and engine braking due to the fault are prevented.

Further, when the vehicle is moving forward in the power recirculation mode wherein the OVR&R/C 92 is engaged so that the engine brake operates, the signal pressure PoslMC of the mode change-over solenoid 260 is generated, and the spool 175a of the mode change-over valve 175 is pushed downwards in FIG. 4, so the H/C 10 can be engaged, as described above. Therefore, simultaneous engaging of the OVR&R/C 92 and H/C 10 is prevented, and an unintended speed change towards the rotation synchronous point RSP is prevented.

{5.2 Running Mode Change-over (Power Recirculation Mode to Direct Mode)}

When a mode change-over is performed from the power recirculation mode to the direct mode, firstly, when the OVR&R/C 92 is engaged, energization of the OVR&R/C solenoid 211 is interrupted, and the OVR&R/C 92 is rapidly disengaged.

At the same time as or slightly after this OVR&R/C 92 is disengaged, the H/C solenoid 190 is energized, and supply of the control pressure Phc is started to engage the H/C 10.

At this time, as the mode change-over valve 175 interrupts energization of the mode change-over solenoid 260 when the OVR&R/C 92 is disengaged, the spool 175a moves up as shown in FIG. 4, the OVR&R/C 92 is disengaged regardless of the control pressure Povrc, and the H/C 10 is engaged.

The FWD/C 91 is always engaged when the D range (forward range) is selected, as shown also in the above Table 1, so the drive torque in the forward direction of the power recirculation mode continues to be transmitted by the FWD/C 91 even during a running mode change-over.

Here, when the H/C 10 is engaged and the H/C solenoid 190 is a normal close type, the control pressure Phc from the H/C control valve 180 is gradually increased by gradually increasing the ON duty ratio which controls this solenoid 190, and when it has risen to the control pressure Phc required to engage the H/C 10, the mode changes over to the direct mode.

Further, in the forward range, by always engaging the FWD/C 91, the change-over between the power recirculation mode and direct mode can be performed rapidly and easily by controlling the engaging state of the H/C 10, and running mode change-over control can be largely simplified compared to the case where the running mode is changed over by alternately connecting the FWD/C 91 and H/C 10.

{5.3 Direct (H) Mode Travel}

In this direct mode, torque is not transmitted from the carrier 50 to the fixed speed ratio transmission output shaft 3c due to the action of the FWD/OWC 93, and torque is transmitted on the drive side and engine brake side only by the H/C 10.

Therefore, in the direct mode, there is no unintended speed change towards the rotation synchronous point RSP as occurred in the aforesaid prior art, even if the FWD/C 91, which transmits drive torque when the vehicle is moving forward in the power recirculation mode, is engaged.

Further, when the vehicle is traveling in the direct mode, the mode change-over solenoid 260 is not energized (OFF) and the signal pressure PsolMC=0, so the spool 175a of the mode change-over valve 175 moves upwards as shown in FIG. 4, and even if the signal pressure Povrc is generated from the OVR&R/C control valve 201 due for example to a fault of the speed change control unit 80, the OVR&R/C 92 is drained via the ports 175g, 175f of the mode change-over valve 175. Hence, simultaneous engaging of the H/C 10 and OVR&R/C 92 does not occur, and an unintended speed change towards the rotation synchronous point RSP as occurred in the aforesaid prior art is definitely prevented.

Thus, in the direct mode, all speed change regions which can be set by the CVT 2 can be used from the CVT ratio icrsp corresponding to the rotation synchronous point RSP to the highest CVT ratio ichi, as shown in FIG. 9.

{5.4 Running Mode Change-over (Direct Mode to Power Recirculation Mode)}

When the vehicle is traveling in the direct mode, by decreasing the ON duty ratio which controls the H/C solenoid 190 and removing (lowering) the control pressure Phc from the H/C control valve 180, when the H/C 10 is finally disengaged, only the FWD/C 91 remains engaged, and there is a smooth change-over from the direct mode to the power recirculation mode.

When the mode change-over solenoid 260 is energized after the control pressure Phc is removed, and the port 175e is made to communicate with the drain port 175f, the shock when there is a change-over of running mode can be suppressed.

In the forward direction of the power recirculation mode, when engine braking is required, the OVR&R/C 92 may be engaged by controlling the OVR&R/C solenoid 211 as described above.

{5.5 R range}

When the vehicle is traveling in the R range, which is the reverse range, the line pressure PL is supplied to the OVR&R/C 92 via the manual valve 230 and shuttle valve 271 so that it is constantly engaged.

At this time, as the line pressure PL (D range pressure Pd) is not supplied to the D range pressure circuit 107, the signal pressure PsolHC is not generated.

Further, the discharge port 246D on the Phi side of the shift control valve 246 is connected to the reverse torque shutoff valve 240 via the ports 230d, 230e of the manual valve 230, as shown in FIG. 6(C).

In this R range, concerning the torque on the engine brake side (forward motion side), below the gyration angle φr between the gyration angle φgnp corresponding to the geared neutral point GNP and the gyration angle φhi set on the small side of the CVT ratio ic (large side of the CVT ratio ic relative to icr), the port 240e which communicates with the discharge port 246D of the shift control valve 246 is connected to the line pressure port 240d, as shown in FIG. 7(C), so the pressure supplied as the oil pressure Phi of the oil chamber 30B is the line pressure PL regardless of whether the reverse torque shutoff valve 240 is connected to the line pressure port 246P or the discharge port 246D.

On the other hand, as the discharge port 246C is drained (pump intake oil passage 104), the pressure Plo of the oil chamber 30A varies between the line pressure PL and 0.

Therefore, below the gyration angle φr set in the vicinity of the geared neutral point GNP in the reverse range, i.e., in FIG. 9, in the range where the IVT speed ratio e is more on the forward motion side than er, differential pressure control of the hydraulic cylinder 30 can be performed only in the range Phi≧Plo. Hence, torque on the engine brake side (forward motion side) in the reverse range cannot be transmitted, excessive engine braking due for example to a fault of the speed change control unit 80 is prevented from occurring, and an unintended speed change in the vicinity of the geared neutral point GNP of the R range is prevented.

Further, in the R range, the gyration angle φr which interrupts the engine brake torque is set between the geared neutral point GNP and the highest side of the CVT ratio ic, so at the gyration angle φr when the vehicle is traveling in the R range, i.e., in a region on the negative of the IVT speed ratio e in FIG. 9, the reverse torque shutoff valve 240 drains the discharge port 246D of the shift control valve 246 via the manual valve 230, port 240e and port 240f, as shown in FIG. 7(E), so engine brake torque is transmitted and drivability is maintained.

In the reverse direction of the power recirculation mode, as described above, the positive torque transmitted from the input disk 21 to the output disk 22 of the CVT 2 is on the drive side (reverse side), and the negative torque is on the engine brake side (forward motion side). Hence, as shown in FIG. 3, a positive torque is transmitted at the oil pressure Phi of the oil chamber 30B, and a negative torque is transmitted at the oil pressure Plo of the oil chamber 30A. This means that, when the differential pressure of the oil cylinders 30 is in the above range Phi≧Plo, a negative torque is not transmitted, so engine braking and an unintended speed change in the aforesaid speed change region (forward motion side of the IVT speed ratio er) above the aforesaid gyration angle φr, are prevented.

As described above, whereas the three-way clutch unit 9 which sets the power recirculation mode of the IVT comprises plural clutches, i.e., the FWD/C 91, OVR&R/C 92 and FWD/OWC 93, the direct mode is set by the H/C 10, and the mode change-over valve 175 is provided which selectively supplies an oil pressure to the H/C 10 and OVR&R/C 92. Thus, in the D range, which is the forward range, simultaneous engaging of the H/C 10 and OVR&R/C 92 due for example to a fault of the speed change control unit 80 is definitively prevented, and an unintended speed change towards the rotation synchronous point RSP as occurred in the aforesaid prior art is prevented.

Further, as the three-way clutch unit 9 comprises the FWD/OWC 93 which transmits torque in only one direction, in the forward range, if only the engaging state of the H/C 10 is controlled leaving the FWD/C 91 always engaged, the change-over between the power recirculation mode and direct mode can be accomplished quickly and easily, and running mode change-over control can be largely simplified in comparison to the case where the running mode change-over is performed by alternately connecting the FWD/C 91 and H/C 10.

Further, by providing the reverse torque shutoff valve 240 which responds to the gyration angle φ (approximately equal to CVT ratio ic), excessive engine braking is definitely prevented from occurring even if, due for example to a fault of the speed change control unit 80, the step motor 136 is driven towards a CVT ratio ic on the opposite side to the travel direction beyond the geared neutral point GNP.

Figure 13:
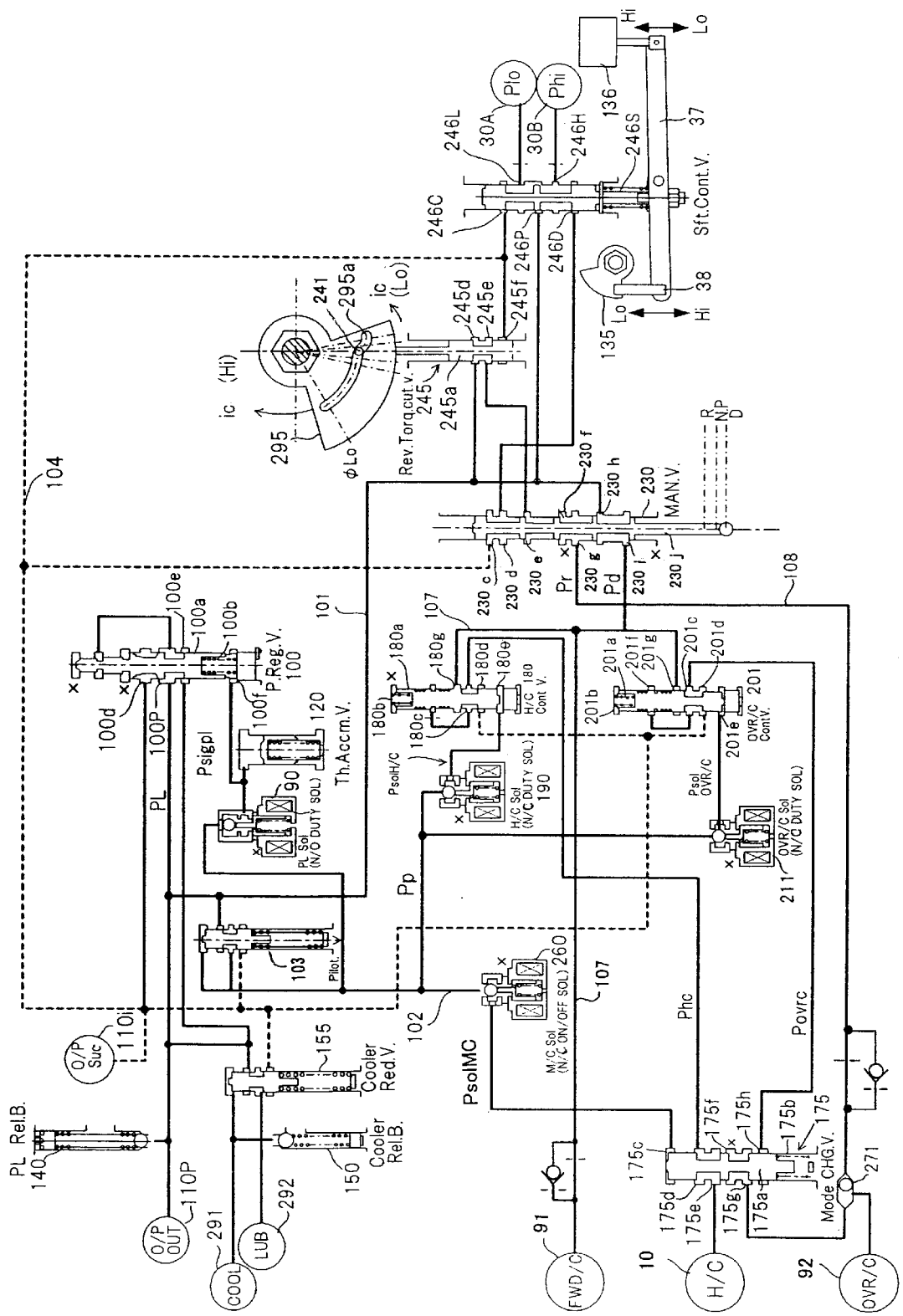
FIG. 13 is similar to FIG. 4, but showing a hydraulic circuit of a speed change controller according to a second embodiment.
Figure 14:
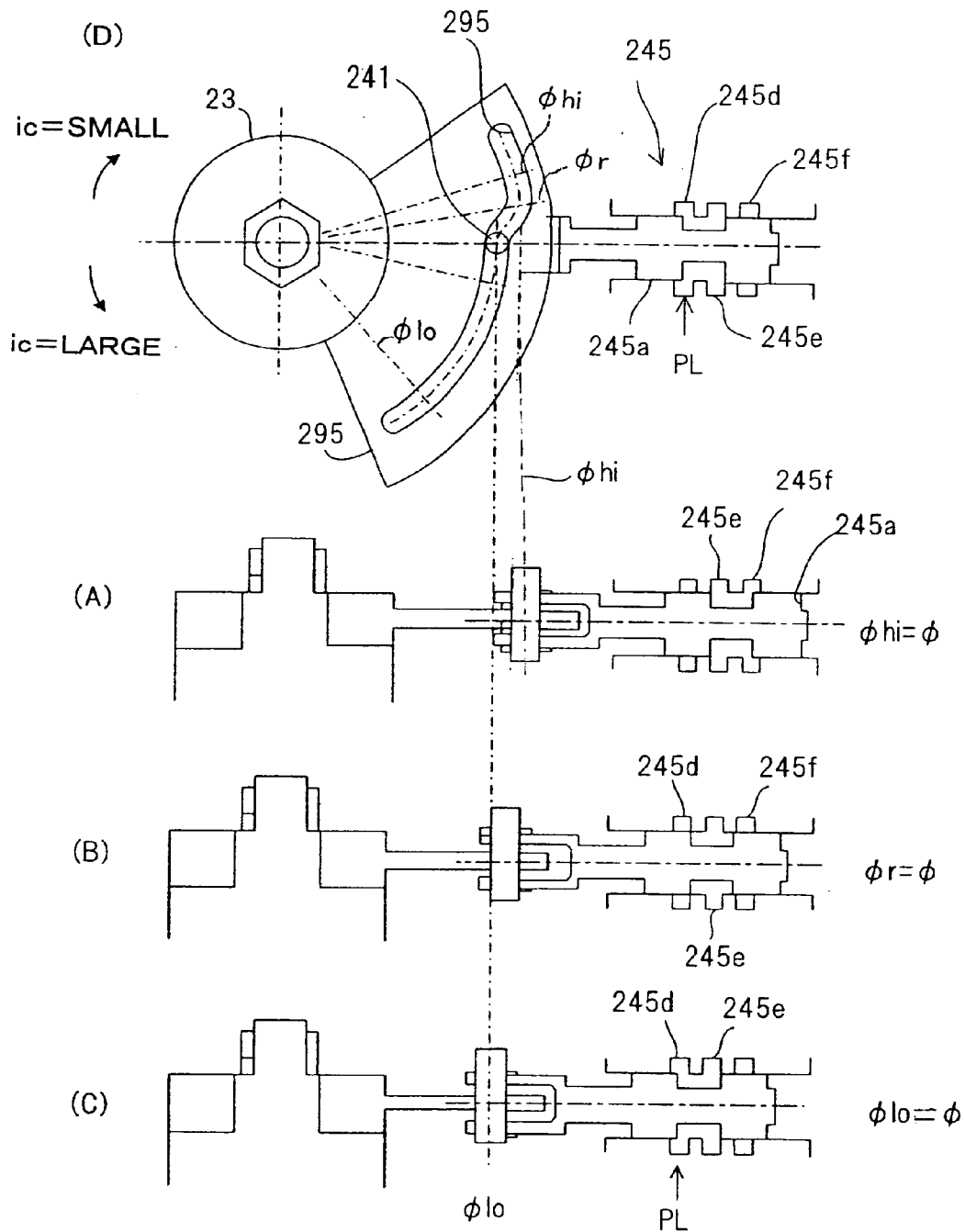
FIG. 14 is a schematic diagram of the reverse torque control valve according to the position of a cam. (A) shows the situation when the gyration angle is from less than ϕgnp to ϕlo, (B) when the gyration angle is ϕr and (C) when the gyration angle is ϕhi. (D) shows the relation between the cam and spool.

FIG. 13, FIG. 14 show a second embodiment wherein the reverse torque shutoff valve of the aforesaid first embodiment controls only engine braking in the reverse direction, and control of the OVR&R/C 92 is only electronic control by the OVR&R/C solenoid 211 where the original pressure of the OVR&R/C control valve 201 is the D range pressure Pd. The remaining features of the construction are identical to those of the aforesaid first embodiment.

In FIG. 13, the D range pressure circuit 107 connected to the D range pressure port 230i of the manual valve 230 is connected to the port 180g of the H/C control valve 180, the port 201g of the OVR&R/C control valve 201 and the FWD/OWC 91, and when the D range, which is the forward range, is selected, the original control pressure Phc and control pressure Povrc are supplied, and the FWD/OWC 91 is engaged.

Next, in a reverse torque shutoff valve 245, the ports 240g, 240b are eliminated from the reverse torque shutoff valve 240 shown in the aforesaid first embodiment, and the operating range of the spool 240a is modified.

A spool 245a of the reverse torque shutoff valve 245 comprises a pin 241 which engages with a cam groove 295b of the cam 295 connected to the trunnion 23, and displaces according to the gyration angle φ of the power roller 20.

A port 245e communicating with the port 230e of the manual valve 230 is made to communicate with one of a line pressure port 245d connected to the line pressure circuit 101, and a port 245f connected to the pump intake oil passage 104 and discharge port 246C of the shift control valve 246, according to the displacement of the spool 245a.

A pin 241 which engages with the cam groove 295b is formed at one end of the spool 245a of the reverse torque shutoff valve 245, as shown in FIG. 13 and FIG. 14. When the CVT ratio ic varies to the large side (Low side), the trunnion 23 and cam 295 rotate in the anticlockwise direction of the figure, and when the CVT ratio ic varies to the small side (High side), the trunnion 23 and cam 295 rotate in the clockwise direction of the figure.

The cam groove 295a formed in the cam 295 drives the spool 245a between the gyration angle φr set larger than the gyration angle φgnp corresponding to the geared neutral point GNP and the gyration angle φgnp, and fixes the spool 245a in regions less than the gyration angle φgnp and beyond the gyration angle φr, as shown in FIG. 8 and FIG. 9.

At the gyration angle φr which is on the reverse side in the power recirculation mode, the spool 245a driven by the cam groove 295b is situated effectively in the middle of the stroke, and the port 245e which can communicate with the discharge port 246D of the shift control valve 246 via the manual valve 230, is sealed as shown in FIG. 14(B).

When the gyration angle varies from φr to the side where the CVT ratio ic is large (Low side) towards the geared neutral point GNP, the cam 295 rotates in the anticlockwise direction in FIG. 13 and FIG. 14(D).

The cam groove 295b is formed so that the spool 245a displaces towards the trunnion 23 in the figure at this time, and when the gyration angle varies beyond φr to φlo where the CVT ratio ic is large, the spool 245a displaces to the position of FIG. 14 (C).

In the interval until the gyration angle reaches φlo which is less than φr, the port 245e communicates with the line pressure port 245d, and the line pressure PL can be supplied to the discharge port 246D of the shift control valve 246 via the manual valve 230.

On the other hand, when the gyration angle on the reverse side in the power recirculation mode varies from φr to φhi where the CVT ratio ic is small (High side), the cam 295 rotates in the clockwise direction in FIG. 13 and FIG. 14(D).

The cam groove 295b is formed so that the spool 245a displaces away from the trunnion 23 at this time, and when the gyration angle varies from φr to φhi where the CVT ratio ic is small, the spool 245a displaces to the position of FIG. 7(A).

When the gyration angle is at a position beyond φr, the port 245e communicates with the port 245f, and the port 230e of the manual valve 230 is connected to the pump intake oil passage 104.

Therefore, in the R range which is the reverse range, as shown in FIG. 6(C), the port 230e communicates with the port 230d of the manual valve 230, and the discharge port 246D of the shift control valve 246 is connected to the port 245e of the reverse torque shutoff valve 245. In a region where the gyration angle is less than φr (from the CVT ratio icr to iclo in FIG. 8), i.e., in the region further to the forward motion side than the gyration angle φr, the line pressure PL is supplied to the discharge port 246D, engine braking in the reverse range is prohibited, and unintended, excessive engine braking due for example to a fault of the speed change control unit 80 is definitively prevented from occurring.

On the other hand, in the region beyond the gyration angle φr (from the CVT ratio icr to ichi in FIG. 8), the discharge port 246D is connected to the pump intake oil passage 104, and the oil pressure Plo of the oil chamber 30B can be arbitrarily set between the line pressure PL and 0, so engine braking in the reverse range can be controlled.

Next, the OVR&R/C control valve 201 is supplied by the original pressure only in the D range, which is the forward range. On the forward motion side of the power recirculation mode shown in FIG. 9, FIG. 17, the OVR&R/C 92 is engaged by the control pressure Povrc only when the signal pressure PsolMC of the mode change-over solenoid 260 and the signal pressure PsolOVR/C from the OVR&R/C solenoid 211 are generated, so engine braking on the forward motion side of the power recirculation mode can be controlled.

On the other hand, in the direct mode, the signal pressure PsolMC is 0, so the spool 175a of the mode change-over valve 175 displaces upwards as shown in FIG. 13, and the port 175g which can communicate with the OVR&R/C 92, communicates with the port 175f and is drained. Hence, the OVR&R/C 92 is not engaged even if a fault occurs in the OVR&R/C solenoid 211 or OVR&R/C control valve 201.

In this embodiment also, when the vehicle is moving forward in the D range, in the power recirculation mode, by setting the signal pressure PsolMC of the mode change-over solenoid 260 to ON, the H/C 10 is drained from the port 175e and port 175f of the mode change-over valve 175, so engaging is not possible even if the control pressure Phc is generated due to a fault, and an unintended speed change towards the rotation synchronous point RSP which occurred in the aforesaid prior art, is prevented.

On the other hand, in the direct mode where the H/C 10 is engaged, by setting the signal pressure PsolMC of the mode change-over solenoid 260 to 0, the OVR&R/C 92 is drained from the port 175g and the port 175f of the mode change-over valve 175, so engaging is not possible even if the control pressure Povrc is generated due to a fault, and an unintended speed change towards the rotation synchronous point RSP such as in the aforesaid prior art, is again prevented.

In this way, by simplifying the construction of the reverse torque shutoff valve 245, an unintended speed change towards the rotation synchronous point can be prevented in both the direct mode and power recirculation mode as in the aforesaid first embodiment, while making the spool 245a compact, simplifying the construction of the hydraulic circuit and suppressing manufacturing costs.

Figure 15:
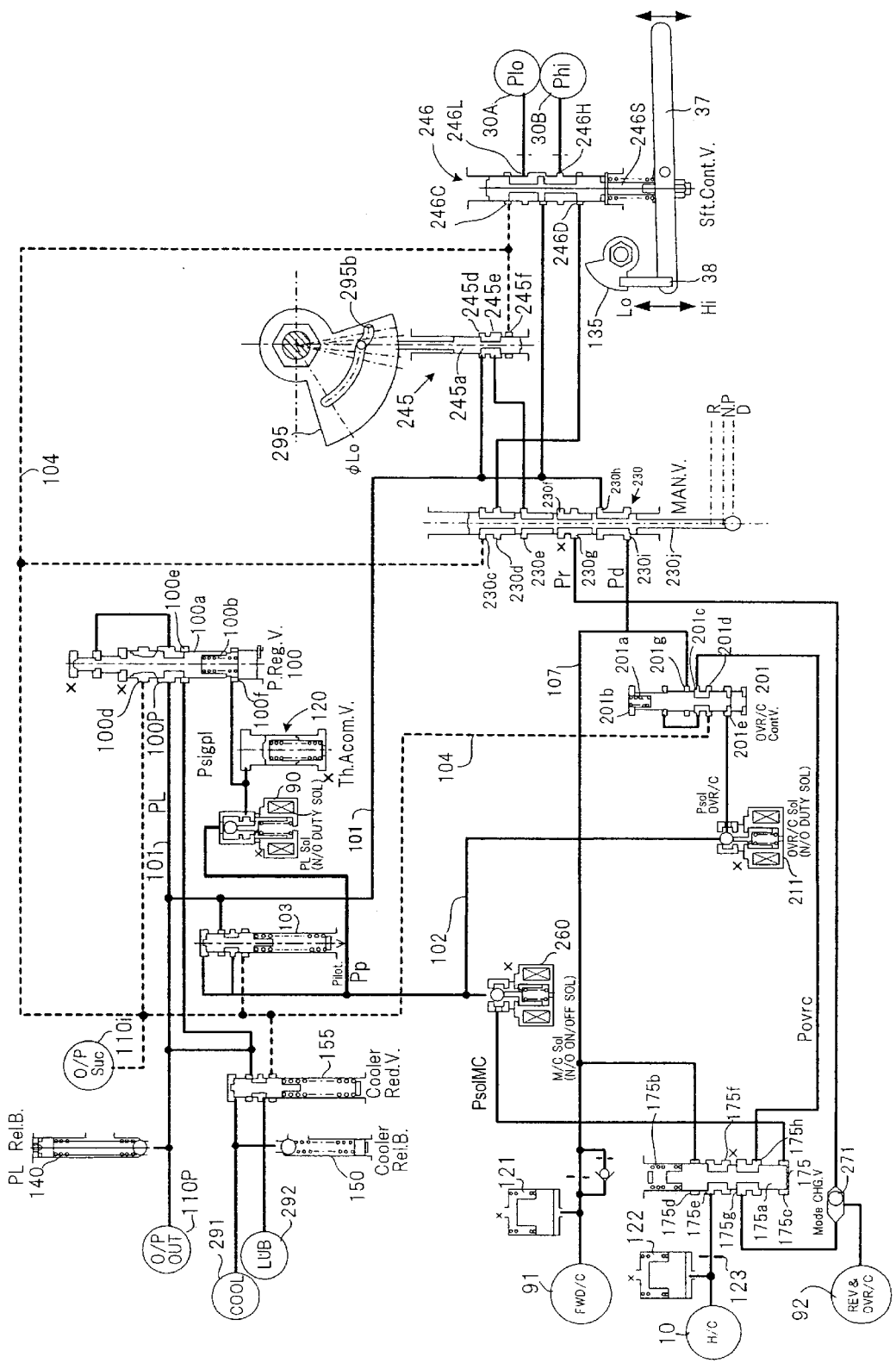
FIG. 15 is similar to FIG. 4, but showing a hydraulic circuit of a speed change controller according to a third embodiment.

FIG. 15 shows a third embodiment, wherein the H/C control valve 180 and H/C solenoid 190 of the aforesaid second embodiment are replaced by an accumulator 122 and orifice 123, and ON/OFF of the signal pressure PsolMC of the mode change-over valve 175 is modified in the direct mode and power recirculation mode. The remaining features of the construction are identical to those of the first embodiment.

The FWD/C 91 is connected to the D range pressure circuit 107 via the accumulator 121, and the D range pressure circuit 107 is connected to the port 201g of the OVR&R/C control valve 201 and the mode change-over valve 175d.

The OVR&R/C control valve 201 is identical to that of the aforesaid first and second embodiments, but in a mode change-over valve 175', the relation between the signal pressure PsolMC and spool 175a is the reverse of that in the aforesaid first and second embodiments.

The signal pressure PsolMC from the mode change-over solenoid 260 is supplied to the oil chamber 175c provided at one end of the spool 175a, and the spool 175a is pushed against the spring 175b.

When the signal pressure PsolMC=0 (OFF), as shown in FIG. 15, the spool 175a is situated below, the ports 175h, 175g communicate, and the signal pressure Povrc from the OVR&R/C control valve 201 can be supplied to the OVR&R/C 92. At the same time, the port 175e communicates with the drain port 175f, and the accumulator 122 interposed between the H/C 10 and port 175e, orifice 123 and H/C 10 are drained and disengaged.

In the power recirculation mode of the D range, the D range pressure Pd is supplied to the accumulator 121 and FWD/C 91 so as to engage the FWD/C 91, and when engine braking is required, the OVR&R/C 92 is engaged by the control pressure Povrc supplied from the OVR&/C control valve 201 by generating the signal pressure PsolOVR/C from the OVR&R/C solenoid 211.

At this time, as the signal pressure PsolMC is OFF, the mode change-over valve 175' cannot supply the D range pressure Pd to the H/C 10, so on the forward motion side of the power recirculation mode, simultaneous engaging of the H/C 10 and OVR&R/C 92 is prevented, and an unintended speed change toward the rotation synchronous point RSP due to a fault is also prevented.

On the other hand, when the signal pressure PsolMC is ON, in FIG. 15, the spool 175a moves up against the spring 175b, the ports 175d, 175e communicate, and the D range pressure Pd from the D range pressure circuit 107 is supplied to the accumulator 122 and H/C 10 via the orifice 123 which causes the clutch to engage and establish the direct mode.

When there is a change-over from the power recirculation mode to the direct mode, the H/C 10 can be gradually engaged while the D range pressure Pd is built up in the accumulator 122, and the change-over of running mode can be performed smoothly without producing a change-over shock.

When this signal pressure PsolMC is ON, the port 175g which can communicate with the OVR&R/C 92 is connected to the drain port 175f, so in the direct mode, simultaneous engaging of the H/C 10 and OVR&R/C 92 is prevented, and an unintended speed change towards the rotation synchronous point is prevented.

When the FWD/C 91 is engaged by N-D selection, by supplying the D range pressure Pd (=line pressure PL) to the FWD/C 91 which was drained, and the accumulator 121, the FWD/C 91 is engaged after buildup of oil pressure in the accumulator 121 is complete. Hence, the vehicle can start smoothly while preventing shocks due to engaging of the clutch.

Thus, as in the case of the aforesaid second embodiment, the H/C solenoid 190 and H/C control valve 180 are rendered unnecessary while at the same time, an unintended change to the rotation synchronous point RSP due to a fault, etc., is prevented. This further simplifies the construction and control of the hydraulic circuit, reduces manufacturing costs, permits a smooth change-over of running mode and vehicle starting, and ensures good running performance.

Figure 16:
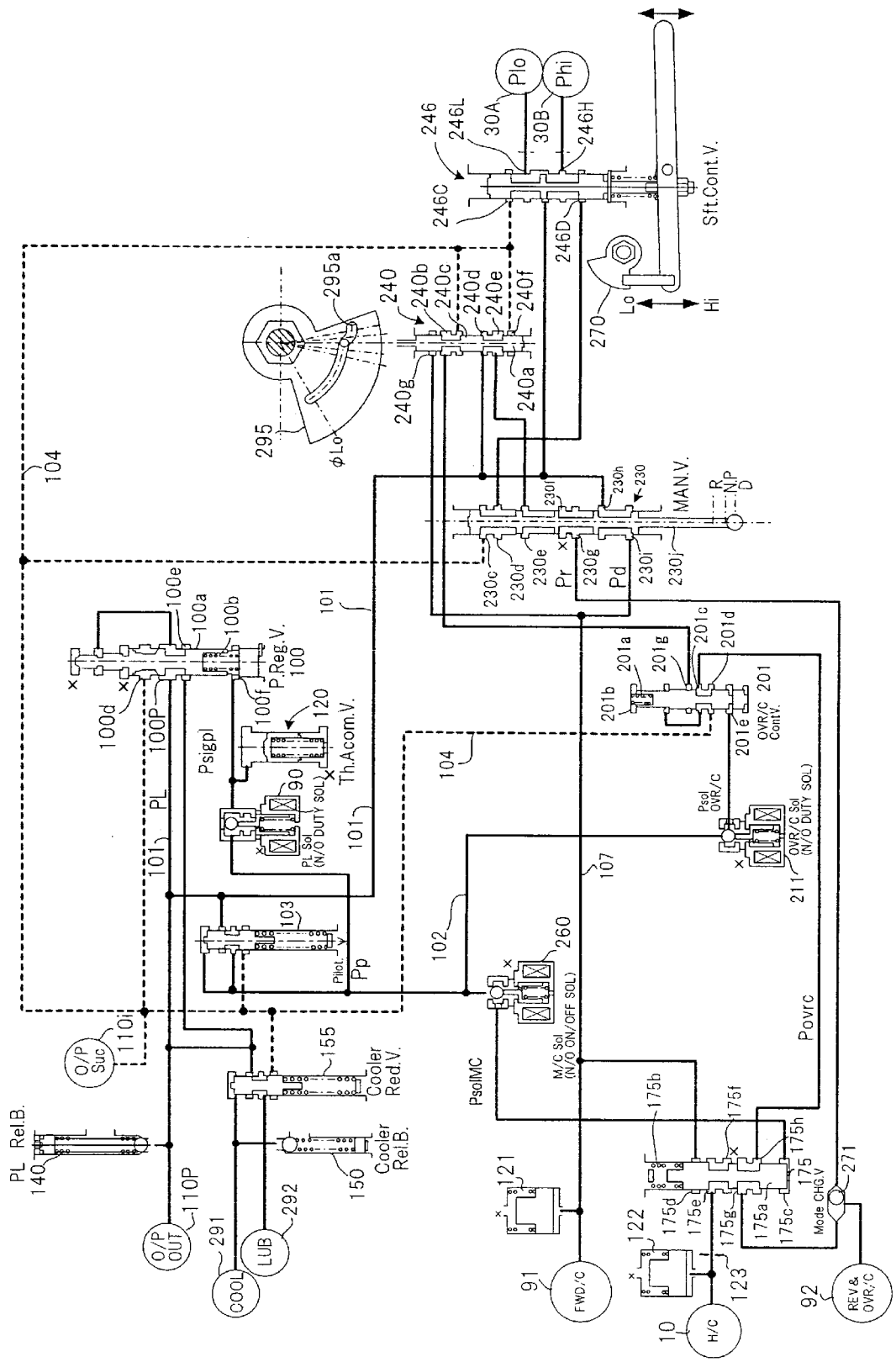
FIG. 16 is similar to FIG. 4, but showing a hydraulic circuit of a speed change controller according to a fourth embodiment.

FIG. 16 shows a fourth embodiment wherein the reverse torque shutoff valve 245 of the third embodiment is replaced by the reverse torque shutoff valve 240 of the first embodiment, and the D range pressure circuit 107 and OVR&R/C control valve 201 are respectively connected to the reverse torque shutoff valve 240. The remaining features of the construction are identical to those of the third embodiment.

In addition to the FWD/C 91, accumulator 121 and port 175d of the mode change-over valve 175, the port 240g of the reverse torque shutoff valve 240 is also connected to the D range pressure circuit 107 which communicates with the D range pressure port 230i of the manual valve 230.

Also, the port 201g of the OVR&R/C control valve 201 is connected to the port 240b of the reverse torque shutoff valve 240, and the port 240b is selectively connected to the port 240g or the port 240c connected to the pump intake oil passage 104 according to the gyration angle φ as in the case of the aforesaid first embodiment.

Therefore, as shown in FIG. 7 to FIG. 9 of the aforesaid first embodiment, in the D range which is the forward range, when the predetermined gyration angle φd is exceeded (less than the CVT ratio icd), engaging of the OVR&R/C 92 is prohibited and engine braking (transmission of torque to reverse side) is restricted. Further, in the R range which is the reverse range, below the predetermined gyration angle φr (larger than the CVT ratio icr), the discharge port 246D of the shift control valve 246 is connected to the line pressure circuit 101 via the ports 230d, 230e of the manual valve 230 and the ports 240e, 240d of the reverse torque shutoff valve 240, hence, the oil pressure Phi of the oil chamber 30B is the line pressure PL, and engine braking (transmission of torque to forward side) is again restricted.

In this case, as in the case of the first embodiment, simultaneous engaging of the H/C 10 and OVR&R/C 92 is prevented, and an unintended speed change towards the rotation synchronous point RSP due to a fault, etc., is prevented. Excessive engine braking due to a fault is prevented by restricting engine braking within preset speed change ranges in the forward range and reverse range. Moreover, as the H/C solenoid 190 and H/C control valve 180 are rendered unnecessary, construction and control of the hydraulic circuit are further simplified, and manufacturing costs can be reduced.

Figure 18:
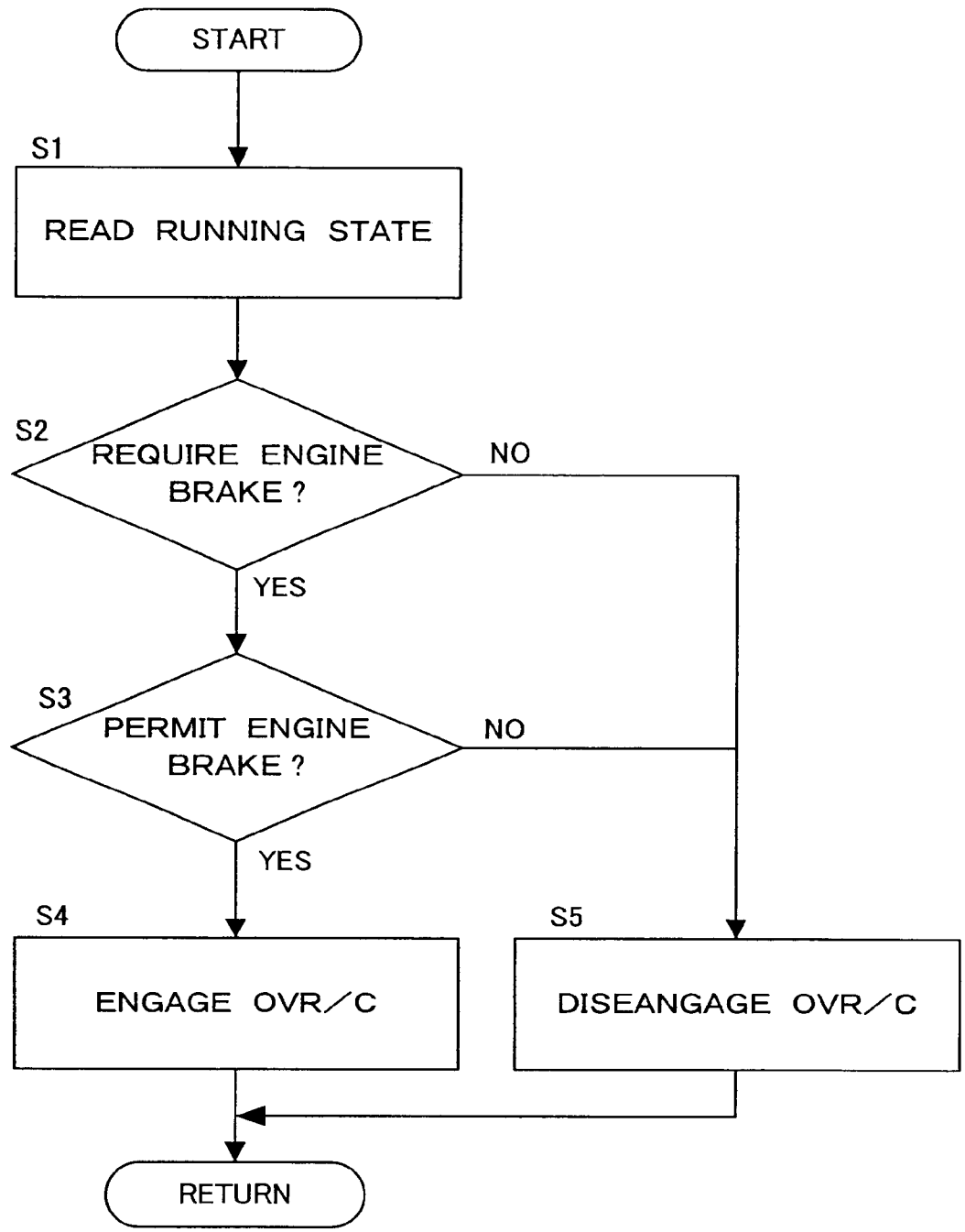
FIG. 18 is a flowchart showing an example of the control of an overrun & reverse clutch.

FIG. 18 is a flowchart showing an example of the control of the OVR&R/C 92 shown from the first embodiment to the fourth embodiment, which is performed at a predetermined interval by the speed change control unit 80 shown in FIG. 5 of the first embodiment.

First, in a step S1, a running state such as the CVT ratio ic (or gyration angle φ, or IVT speed ratio e) based on a selector position POS from the inhibitor switch 85, vehicle speed VSP from the vehicle speed sensor 83, unit input shaft rotation speed Ni from the unit input shaft rotation speed sensor 81 and rotation speed No from the CVT output shaft rotation speed sensor 82, is read.

In a step S2, it is determined whether or not, in the forward range, the detected selector position POS is set to the Ds range (sports range) or M range (manual mode) requiring engine braking, and if it is in the Ds range or M range, the routine proceeds to a step S3, otherwise the routine proceeds to a step S5 and the OVR&R/C 92 is disengaged.

Next, in a step S3, as shown in FIG. 8, FIG. 9, it is determined whether the CVT ratio iv or the gyration angle φ is larger than the CVT ratio icd (Low side) or less than φd, or whether the IVT speed ratio e is greater than ed, and the vehicle is in a running range which permits engine braking in the forward range.

If the vehicle is in a range which permits engine braking, the routine proceeds to a step S4 and the OVR&R/C 92 is engaged, while in a region where engine braking is prohibited (less than icd), the routine proceeds to the step S5, and the OVR&R/C 92 is disengaged.

In a step S4, the mode change-over solenoid 260 and overrun clutch solenoid 211 are energized so that the control pressure Povrc is generated or can be generated, and oil pressure is supplied or can be supplied from the mode change-over valve 175 to the OVR&R/C 92 so as to engage the OVR&R/C 92. As in the case of the aforesaid first embodiment, when the reverse torque shutoff valve 240 operates in the forward range, the control pressure Povrc can be generated, and the control pressure Povrc can be supplied from the mode change-over valve 175 to the OVR&R/C 92.

On the other hand, in a step S5, energization to the overrun clutch solenoid 211 and mode change-over solenoid 216 are interrupted, and the OVR&R/C 92 is connected to the drain and disengaged.

By electronically controlling the OVR&R/C 92 according to the CVT ratio ic and IVT speed ratio e, as described above, a failsafe mechanism is provided in addition to mechanical control such as the reverse torque shutoff valve 240.

In the above embodiments, an example was shown where the three-way clutch unit 9 was used as the clutch which sets the power recirculation mode, but this three-way clutch unit 9 may also be used to set the direct mode, the functions of the three-way clutch unit 9 may comprise at least torque transmission in only one direction, torque transmission in both directions and torque interruption, and the unit may additionally have other functions.

The contents of Japanese Application No.2000-94795, with a filing date Mar. 30, 2000 is hereby incorporated by reference.

The embodiments of this invention in which an exclusive property or privilege is claimed are defined as follows:

What is claimed is:

1. An infinite speed ratio continuously variable transmission for a vehicle, comprising:
    a continuously variable transmission which can vary speed ratio continuously and has a geared neutral point which is a speed ratio making a unit output shaft stationary,
    a fixed speed ratio transmission,
    a unit input shaft which connects to input side of the continuously variable transmission and the fixed speed ratio transmission,
    said unit output shaft which connects to output side of the continuously variable transmission and the fixed speed ratio transmission via a planetary gear set,
    a first clutch device interposed between the fixed speed ratio transmission and the planetary gear set, which sets a power recirculation mode,
    a second clutch device interposed between the continuously variable transmission and the unit output shaft, which sets a direct mode,
    a clutch control unit which controls the power recirculation mode and the direct mode by selectively engaging the first clutch device and the second clutch device,
    a switch which commands a forward running of the vehicle, and
    a sensor which detects the speed ratio of the continuously variable transmission or an overall speed ratio of the infinite speed ratio continuously variable transmission,
    wherein at least one of the first clutch device and the second clutch device is provided with a one way clutch, a first clutch interposed in series to the one way clutch and a second clutch which is provided in parallel to the one way clutch, the first clutch and the one way clutch being arranged to cooperate to transmit torque in only one direction, the second clutch functioning to transmit torque in both directions, and
    the clutch control unit permits engaging only one of the first clutch device and the second clutch device when both the first clutch device and the second clutch device can transmit torque in both directions, and arranged to engage the first clutch at all times when the forward running of the vehicle is specified and to prohibit the engaging of the second clutch when the speed ratio of the continuously variable transmission coincides with the geared neutral point.

2. The infinite speed ratio continuously variable transmission as defined in claim 1, wherein the first clutch device comprises the one way clutch, the first clutch and the second clutch, and the second clutch device comprises a high clutch which functions to transmit torque in both directions.

3. The infinite speed ratio continuously variable transmission as defined in claim 1, wherein the clutch control unit comprises:
    a first hydraulic supply device which supplies an oil pressure to engage the first clutch at all times when the forward running of the vehicle is specified,
    a second hydraulic supply device which supplies an oil pressure to engage the second clutch, and
    a third hydraulic supply device which supplies an oil pressure to engage the high clutch,
    wherein the clutch control unit is arranged to permit the second hydraulic supply device to supply oil pressure to engage the second clutch while prohibiting the third hydraulic supply device from supplying oil pressure to engage the high clutch when the forward running of the vehicle is specified and engine brake is required, and to permit the third hydraulic supply device to supply oil pressure to engage the third clutch while prohibiting the second hydraulic supply device from supplying oil pressure to engage the second clutch when the forward running of the vehicle is specified and the direct mode is set.

4. The infinite speed ratio continuously variable transmission as defined in claim 3, wherein the clutch control unit comprises a mode change-over valve which selectively supplies oil pressure to the other of the second clutch and the high clutch according to an energization state of a first actuator, and a second actuator which controls oil pressure supplied by the second hydraulic supply device to the second clutch via the mode change-over valve.

5. The infinite speed ratio continuously variable transmission as defined in claim 4, wherein the clutch control unit further comprises a third actuator which controls oil pressure supplied by the third hydraulic supply device to the high clutch via the mode change-over valve.

6. The infinite speed ratio continuously variable transmission as defined in claim 4, wherein the mode change-over valve comprises a valve body pushed by an elastic member, the elastic member holding the valve body when the first actuator is not energized at a position at which the mode change-over valve supplies oil pressure to the high clutch while releasing oil pressure of the second clutch to the atmosphere.

7. The infinite speed ratio continuously variable transmission as defined in claim 4, wherein the second actuator is arranged to, when not energized, interrupt or reduce the oil pressure supply of the second hydraulic supply device to the second clutch via the mode change-over valve.

8. The infinite speed ratio continuously variable transmission as defined in claim 5, wherein the third actuator is arranged to, when not energized, interrupt or reduce the oil pressure supply of the third hydraulic supply device to the high clutch via the mode change-over valve.

9. The infinite speed ratio continuously variable transmission as defined in claim 1, wherein the clutch control unit comprises a mode change-over valve which selectively supplies oil pressure to one of the second clutch and the high clutch while prohibiting supply of oil pressure to the other of the second clutch and the high clutch according to an energization state of a first actuator, and is arranged to supply oil pressure for engaging the first clutch to the high clutch when the mode change-over valve is changed-over to supply of oil pressure to the high clutch while prohibiting supply of oil pressure to the second clutch.

10. The infinite speed ratio continuously variable transmission as defined in claim 4, wherein the mode change-over valve is arranged to release the oil pressure of the high clutch to the atmosphere when the first actuator is not energized.

* * * * *